(12) United States Patent
Yamazaki et al.

(10) Patent No.: US 12,109,601 B2
(45) Date of Patent: Oct. 8, 2024

(54) METHOD FOR MANUFACTURING PRESS-FORMED PRODUCT

(71) Applicant: NIPPON STEEL CORPORATION, Tokyo (JP)

(72) Inventors: Shohei Yamazaki, Tokyo (JP); Ryuichi Nishimura, Tokyo (JP); Koichi Hamada, Tokyo (JP); Takuya Oishi, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 317 days.

(21) Appl. No.: 17/632,805

(22) PCT Filed: Aug. 6, 2020

(86) PCT No.: PCT/JP2020/030278
§ 371 (c)(1),
(2) Date: Feb. 4, 2022

(87) PCT Pub. No.: WO2021/025137
PCT Pub. Date: Feb. 11, 2021

(65) Prior Publication Data
US 2022/0274150 A1 Sep. 1, 2022

(30) Foreign Application Priority Data
Aug. 6, 2019 (JP) .................................. 2019-144366

(51) Int. Cl.
*B21D 22/26* (2006.01)
*B21D 22/20* (2006.01)
(Continued)

(52) U.S. Cl.
CPC ............. *B21D 22/26* (2013.01); *B21D 28/26* (2013.01); *B62D 25/105* (2013.01); *B62D 25/12* (2013.01)

(58) Field of Classification Search
CPC ...... B21D 22/26; B21D 22/22; B21D 22/201; B21D 28/26; B21D 53/88
See application file for complete search history.

(56) References Cited

U.S. PATENT DOCUMENTS

| 8,215,451 B2 | 7/2012 | Nishimura et al. |
| 10,022,763 B2 | 7/2018 | Tanaka et al. |

(Continued)

FOREIGN PATENT DOCUMENTS

| CN | 104590397 B | 5/2017 |
| EP | 2 942 123 B1 | 2/2019 |

(Continued)

*Primary Examiner* — Mohammed S. Alawadi
(74) *Attorney, Agent, or Firm* — Birch, Stewart, Kolasch & Birch, LLP

(57) ABSTRACT

A method for manufacturing a press-formed product suppresses occurrence of a forming defect such as a crack in a starting material during press forming, and also suppresses occurrence of problems when transferring a starting material during press forming. A manufacturing intermediate is formed by forming, in a flat-sheet shaped blank sheet, a planned outline portion including an undulating shape which is used for forming an outline of an outer circumferential portion of a press-formed product. The flat shape of the blank sheet is maintained in a region from the planned outline portion toward the center of the manufacturing intermediate, or an intermediate stretch-formed portion having a predetermined intermediate forming height is formed in the manufacturing intermediate in the region. A through-hole is formed by piercing a flat portion at which the flat shape is maintained or a stretch-formed-side top portion of the intermediate stretch-formed portion.

12 Claims, 22 Drawing Sheets

(51) Int. Cl.
*B21D 22/22* (2006.01)
*B21D 28/26* (2006.01)
*B21D 53/88* (2006.01)
*B62D 25/10* (2006.01)
*B62D 25/12* (2006.01)

(56) References Cited

U.S. PATENT DOCUMENTS

| | | |
|---|---|---|
| 2009/0167060 A1 | 7/2009 | Zanolin et al. |
| 2012/0325990 A1* | 12/2012 | Ishizuki ............... B21D 35/001 |
| | | 72/275 |
| 2017/0056949 A1 | 3/2017 | Yonemura et al. |
| 2018/0001368 A1 | 1/2018 | Otsuka et al. |

FOREIGN PATENT DOCUMENTS

| | | |
|---|---|---|
| JP | 2000-42645 A | 2/2000 |
| JP | 2001-87818 A | 4/2001 |
| JP | 2009-517283 A | 4/2009 |
| JP | 5920280 B2 | 5/2016 |
| JP | 2017-164774 A | 9/2017 |
| KR | 10-1639129 B1 | 7/2016 |
| WO | WO 2016/103682 A1 | 6/2016 |

\* cited by examiner

FIG.9
(A)
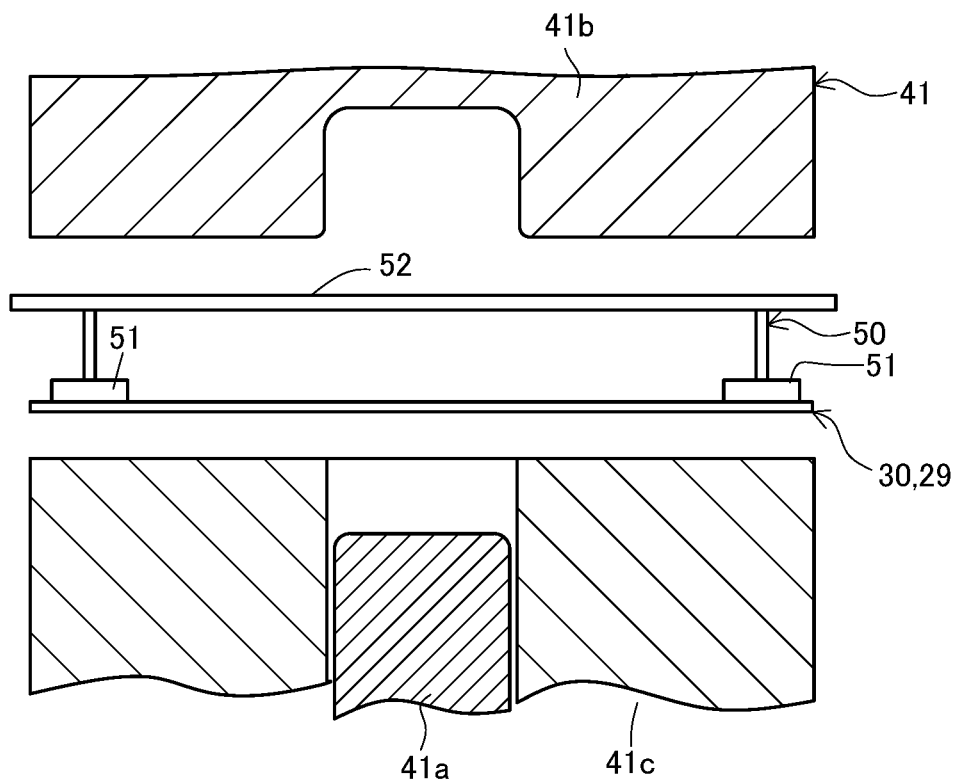
PROCESS OF (i) (FORMING OF PLANNED OUTLINE PORTION)
(B)
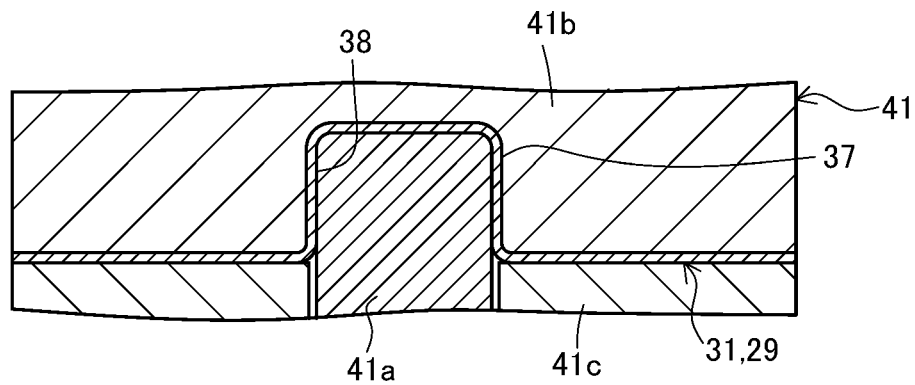
PROCESS OF (i) (FORMING OF PLANNED OUTLINE PORTION)

FIG.10
(A)
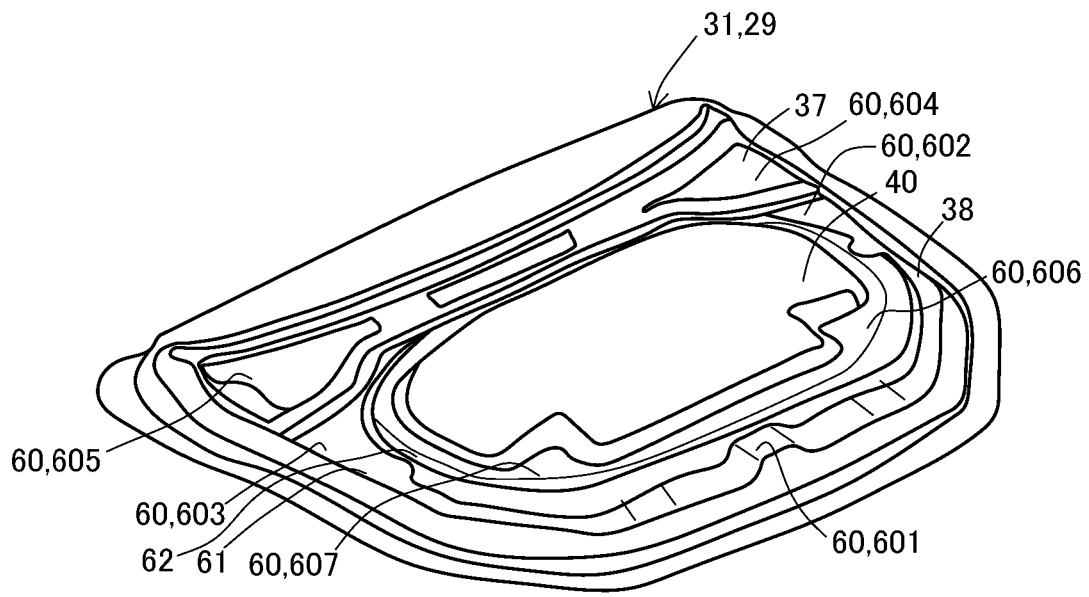
(B)
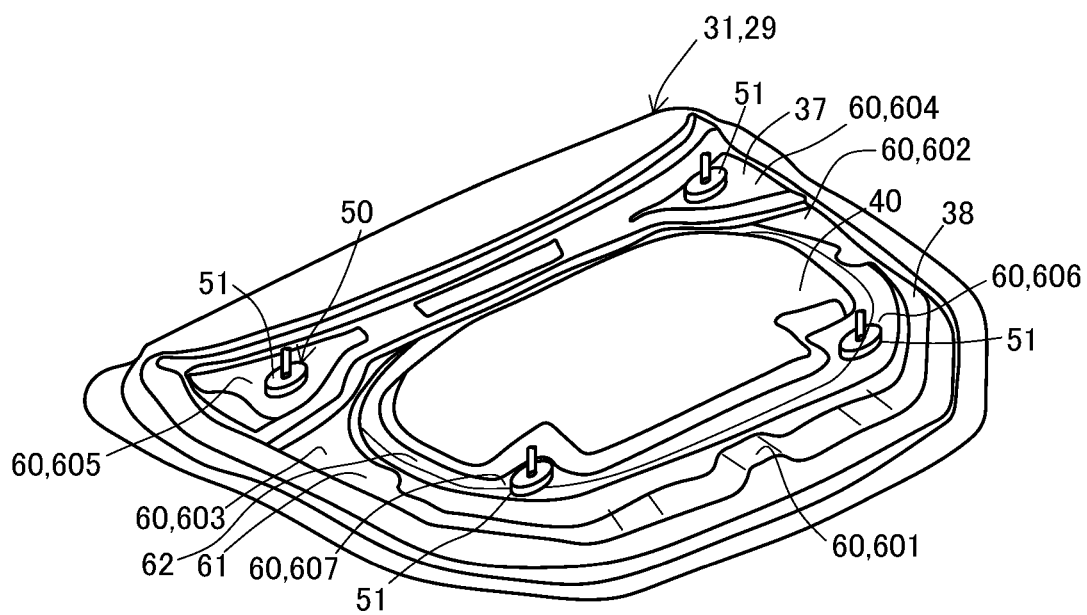

FIG.11
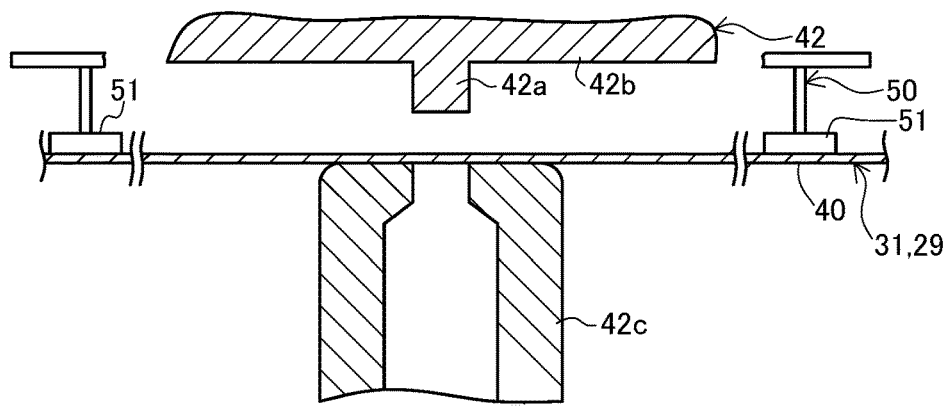
PROCESS OF (ii) (FORMING OF THROUGH-HOLE)
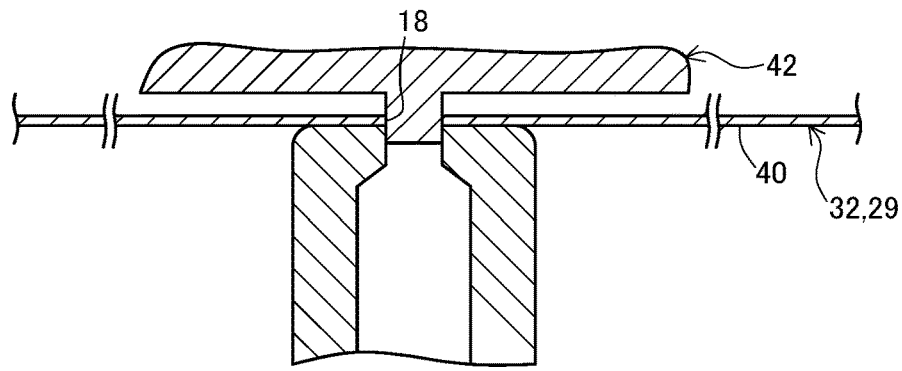
PROCESS OF (ii) (FORMING OF THROUGH-HOLE)
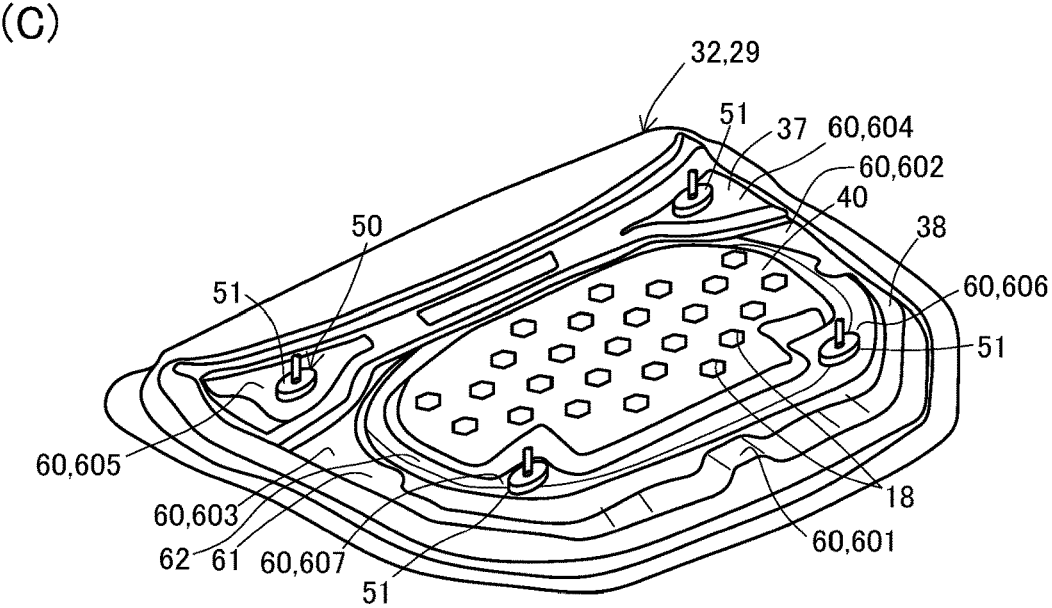
PROCESS OF (ii) (FORMING OF THROUGH-HOLE)

FIG.12
(A)
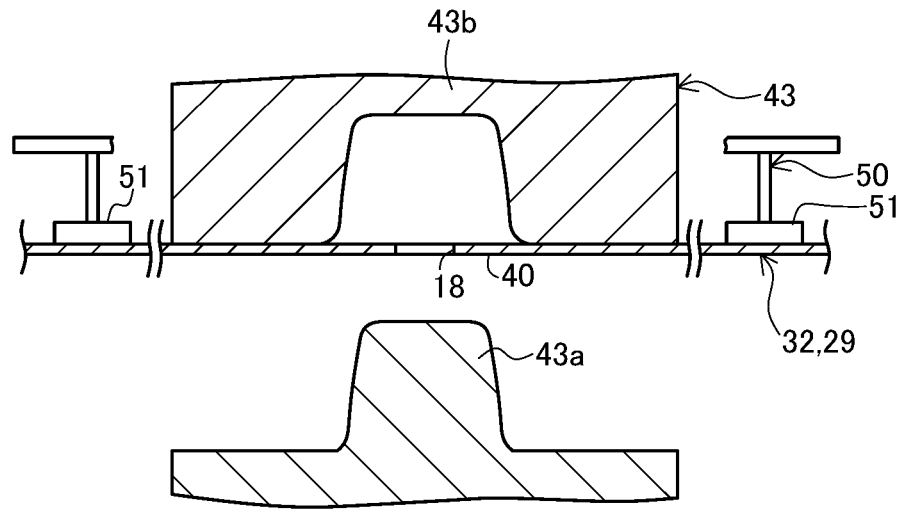
PROCESS OF (iii) (FORMING OF STRETCH FORMED PORTION)
(B)
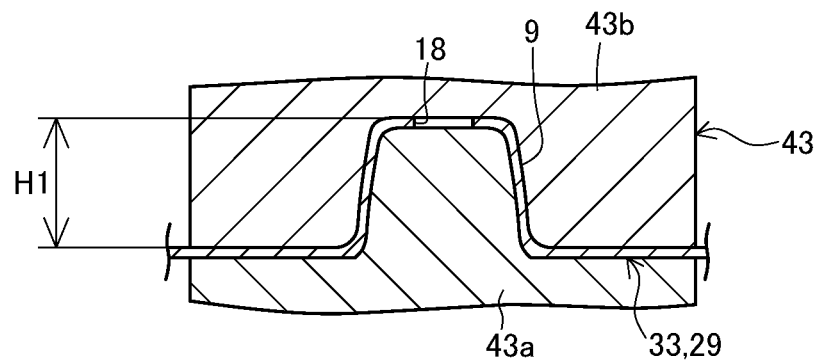
PROCESS OF (iii) (FORMING OF STRETCH FORMED PORTION)

FIG.13
(A)
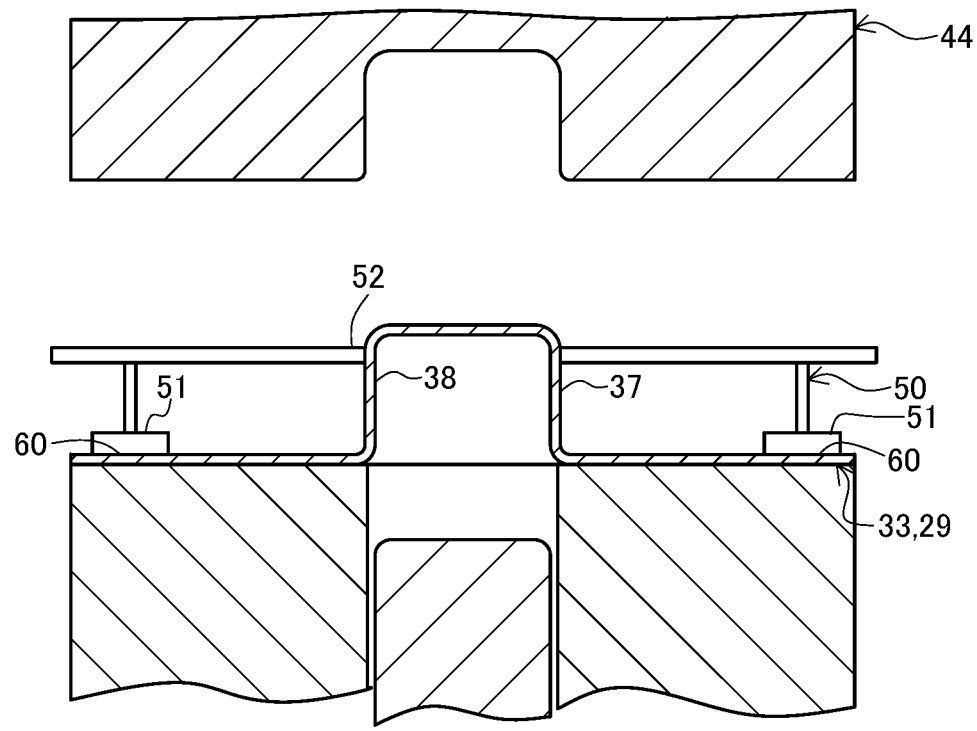
PROCESS OF (iv) (FINISHING WORK)
(B)
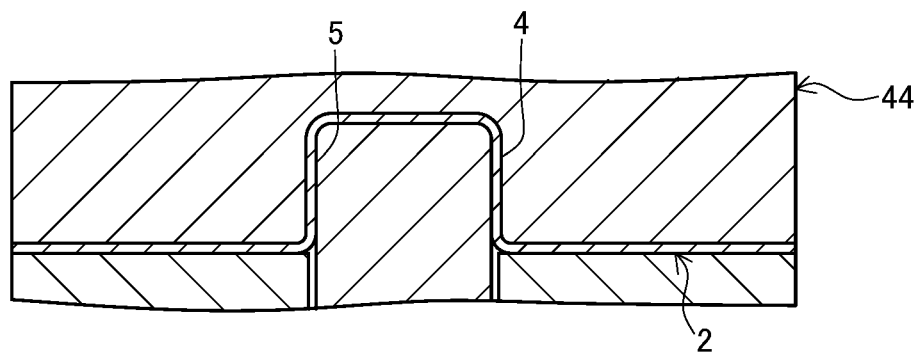
PROCESS OF (iv) (FINISHING WORK)

FIG.14
(A)
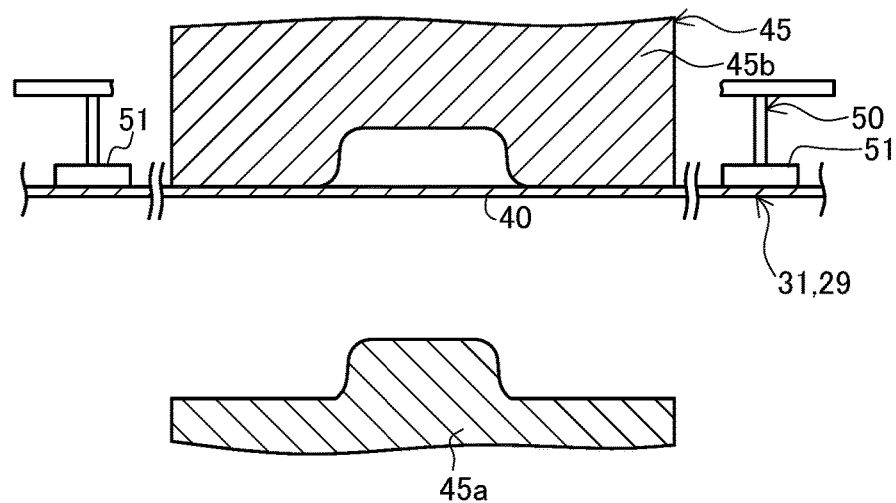
PROCESS OF (v) (FORMING OF INTERMEDIATE STRETCH FORMED PORTION)
(B)
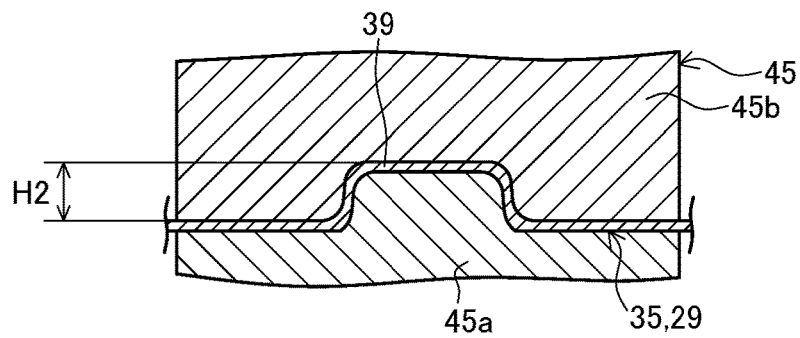
PROCESS OF (v) (FORMING OF INTERMEDIATE STRETCH FORMED PORTION)

MODIFICATION OF PROCESS OF (ii)

FIG.16
(A)
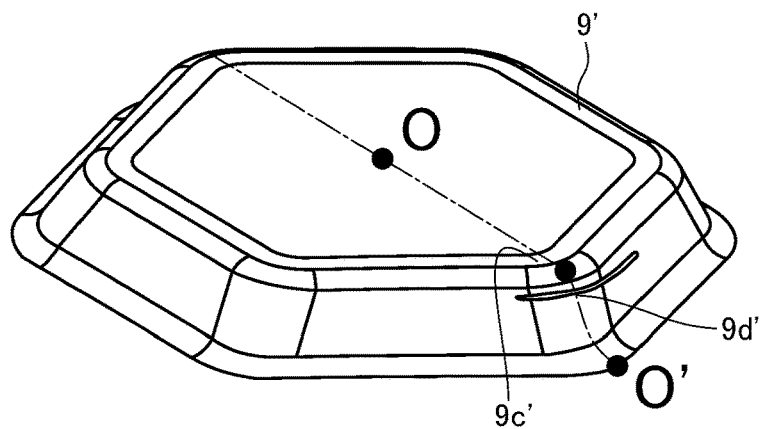
(B)
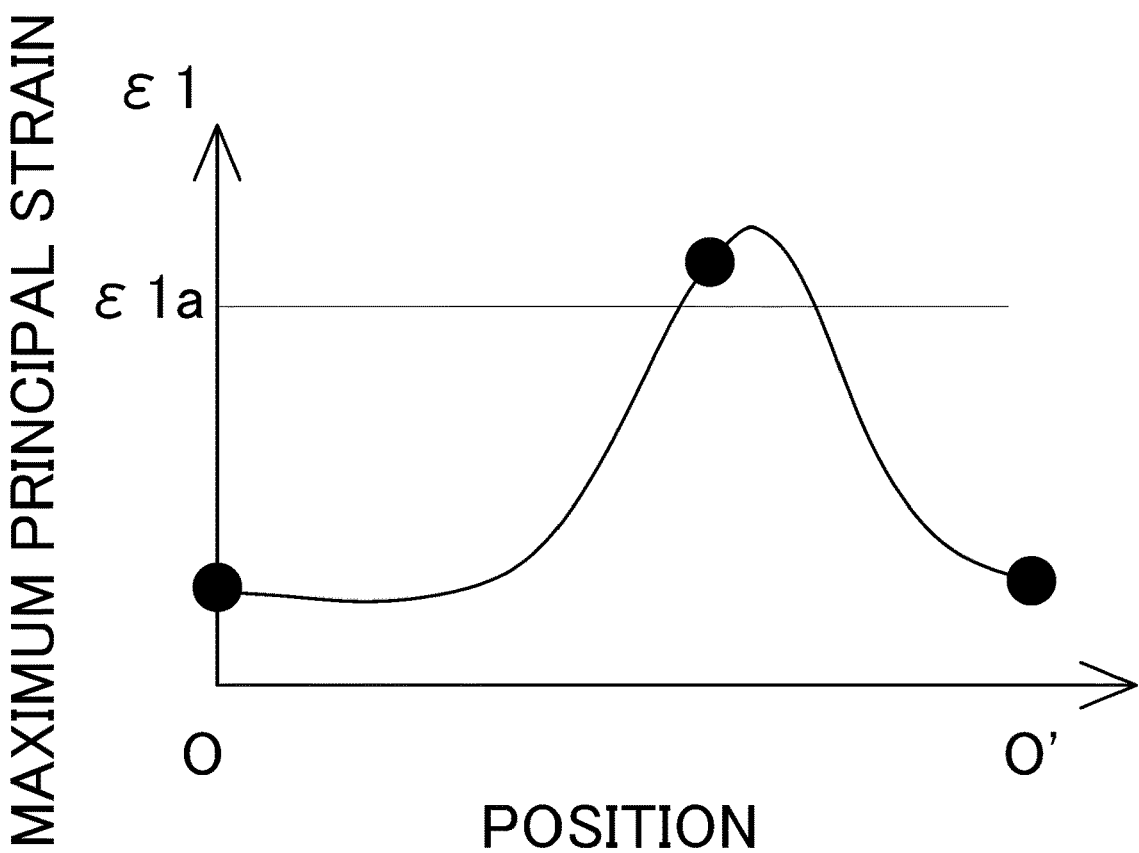

FIG.17
(A)
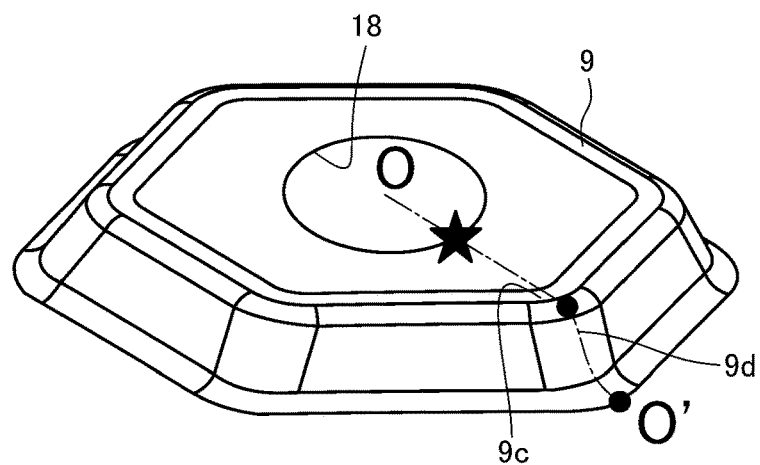
(B)
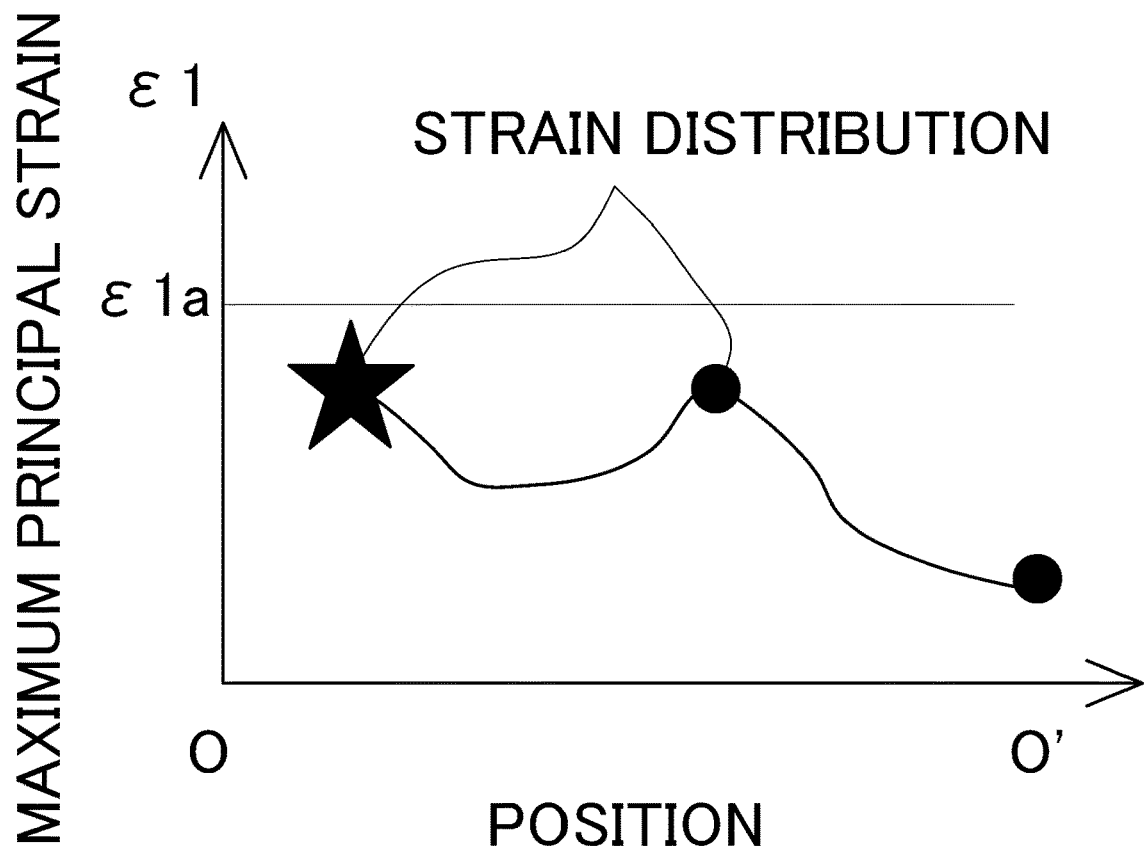

FIG.18
(A)
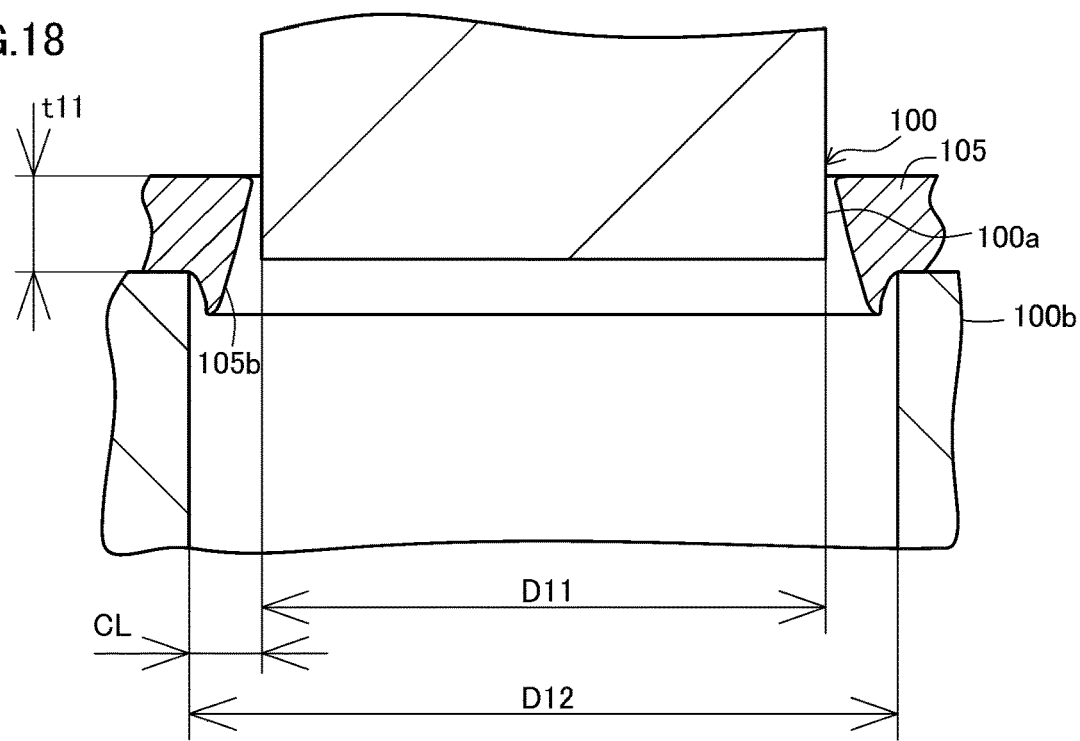
(B)
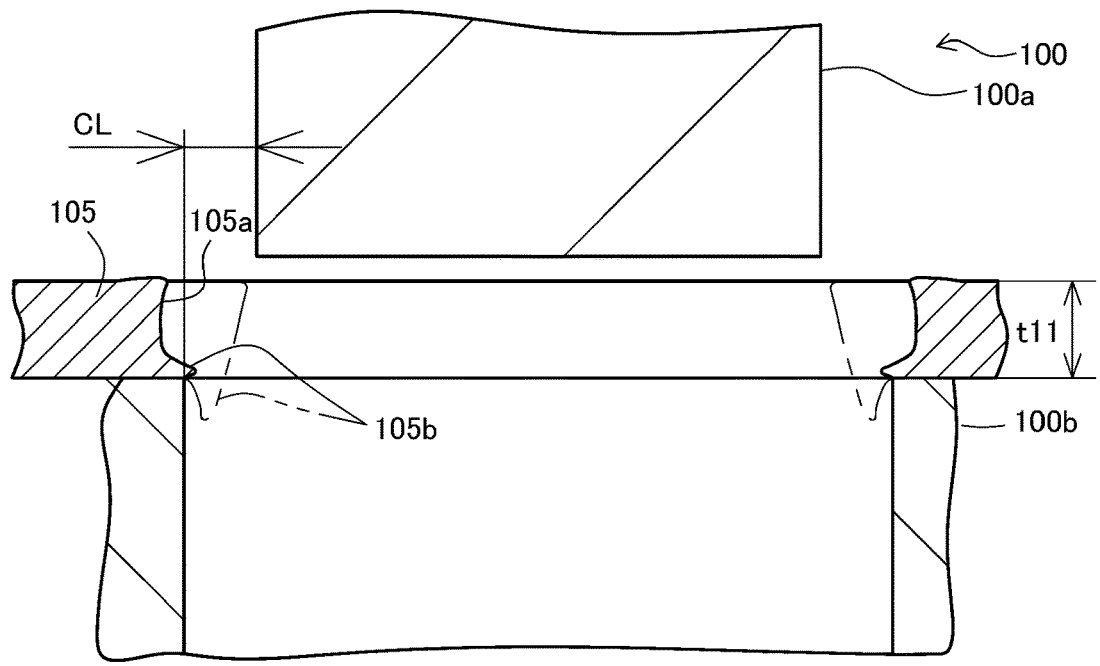

FIG.20
(A)
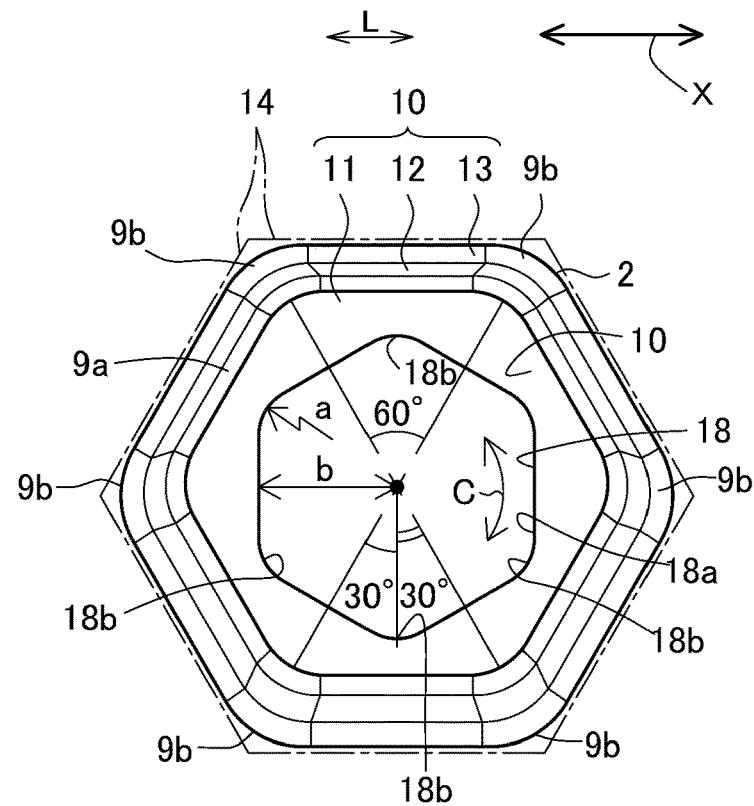
(B)
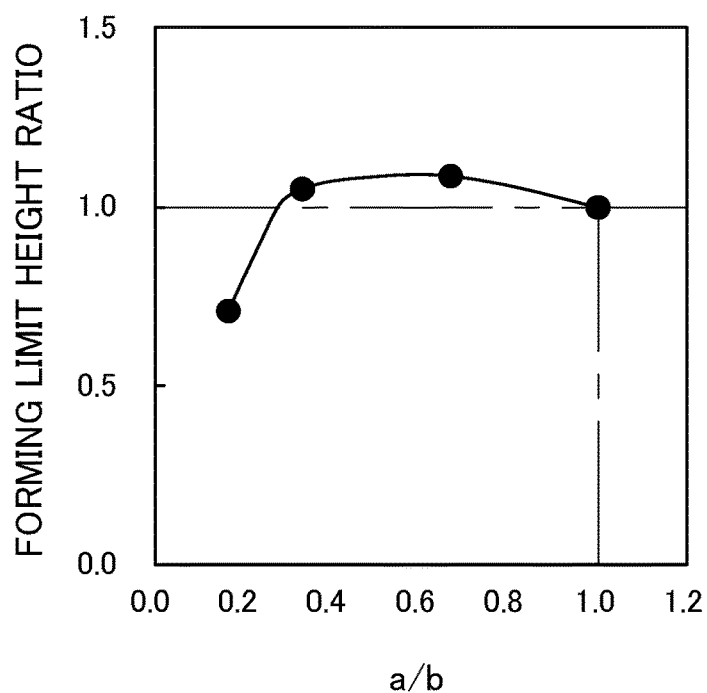

FIG.21
(A)
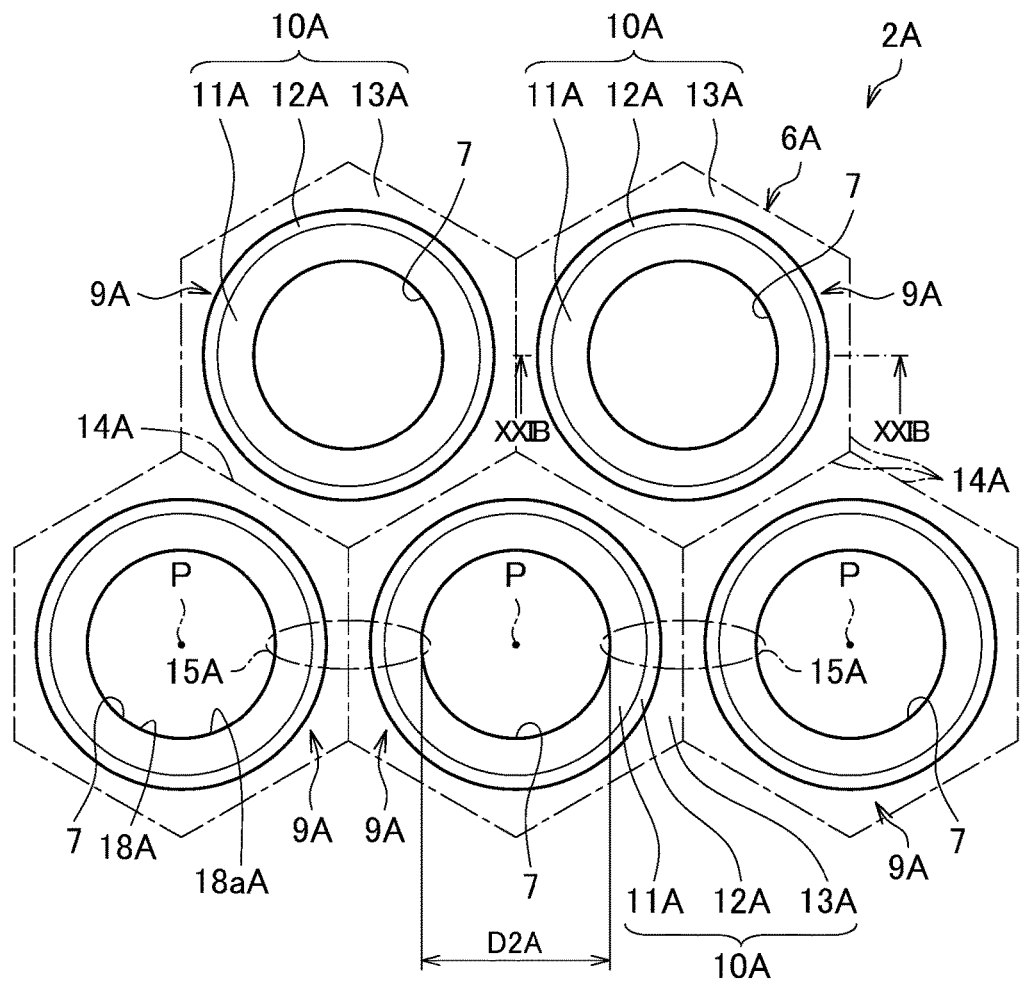
(B)
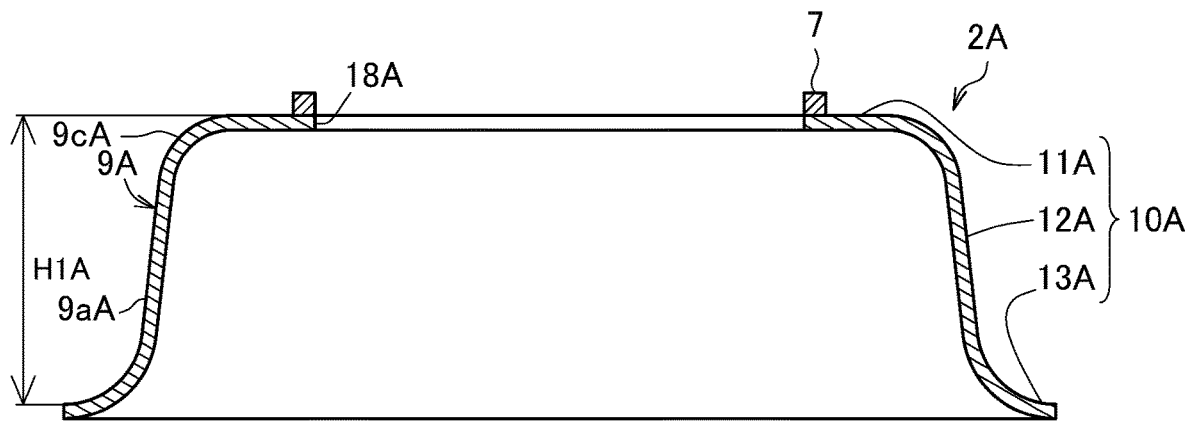

METHOD FOR MANUFACTURING PRESS-FORMED PRODUCT

TECHNICAL FIELD

The present invention relates to a method for manufacturing a press-formed product.

BACKGROUND ART

A press-formed product such as an inner panel of an automobile hood is formed by subjecting a blank to press forming (for example, see Patent Documents 1 and 2).

LIST OF PRIOR ART DOCUMENTS

Patent Document

Patent Document 1: JP2001-87818A
Patent Document 2: JP5920280B

SUMMARY OF INVENTION

Technical Problem

An inner panel, for example, has a bottom portion, an inclined wall rising from the bottom portion, and a flange which is provided in the inclined wall and which is to be joined to an outer panel. When forming the inner panel from a steel blank, one part of the blank is stretch-formed to form a stretch-formed portion by press forming. The stretch-formed portion includes a portion that will serve as an inclined wall and a portion that will serve as a flange.

There is a demand to make press-formed products with thin walls by using steel sheets that have higher tensile strengths in order to achieve further reductions in weight. For example, although on one hand consideration is being given to making the sheet thickness of the inner panel of an automobile hood less than 0.6 mm to achieve a reduction in weight, on the other hand there is also a need to secure bending rigidity. If the sheet thickness of an inner panel is made thin in this way, it is necessary to increase the height of the inclined wall, that is, the stretch-form height, of the stretch-formed portion, to secure rigidity. In such a case, the amount of strain increases in the vicinity of the front end side in a stretch-forming direction of the stretch-formed portion during press forming, and in some cases the ductility is insufficient and cracks occur during the course of the press forming. Such cracks are the cause of forming defects.

Furthermore, in a press forming process, in some cases a starting material which is in the course of being formed may be transferred in sequence between a plurality of press forming machines for every one or plurality of processes to form the starting material into a press-formed product. Therefore, when transferring a thin sheet between press forming machines, care must be taken to ensure that the starting material is not subjected to an unwanted external force and deformed. Here, means for transferring a thin sheet is limited. For example, it is conceivable to use a vacuum carrier machine to transfer a thin sheet while sucking the starting material. However, in practice, it is not realistic for suction ports of the vacuum carrier machine to suck the whole area of the surface of the starting material, and the vacuum carrier machine transfers the starting material while the suction ports suck some of the starting material. Therefore, in some cases a part of the starting material that is separated from a suction port may deflect downward due to its own weight, and an unintended plastic deformation may occur. If such a deformation occurs, the dimensional accuracy of the press-formed product will decrease. Further, if the starting material deflects when the starting material is being transferred while being sucked by the vacuum carrier machine, even if a plastic deformation does not occur, there is a risk that a gap will be formed between the starting material and the suction port due to the deflection of the starting material, and a reduction in the suction force will occur. A reduction in the suction force may cause misalignment of the starting material relative to the suction ports, or cause the starting material to fall off the vacuum carrier machine. If such kind of misalignment occurs, a deviation will arise with respect to the relative position between the starting material and the press forming machine, and in this case also the dimensional accuracy of the press-formed product will decrease. Further, if the starting material falls off, it will lead to a decrease in productivity.

However, it cannot be said that Patent Document 1 or 2 disclose any measure to address the problem that arises when transferring a thin sheet during press forming. Further, such a problem is not limited to an automobile inner panel, and also exists with respect to other press-formed products.

One objective of the present invention is to provide a method for manufacturing a press-formed product which can suppress occurrence of forming defects, such as cracks, in a starting material during press forming, and can also suppress occurrence of problems in a case of transferring a starting material during press forming.

Solution to Problem

The gist of the present invention is a method for manufacturing a press-formed product that is described hereunder.

(1) A method for manufacturing a press-formed product, including:

forming a manufacturing intermediate by forming a planned outline portion including an undulating shape in a flat-sheet shaped blank sheet, as a planned portion for an outline portion which forms an outline of an outer circumferential portion of the press-formed product;

maintaining a flat shape of the blank sheet in a region from the planned outline portion toward a center of the manufacturing intermediate, or forming an intermediate stretch-formed portion having a predetermined intermediate forming height in the manufacturing intermediate in a region from the planned outline portion toward a center of the manufacturing intermediate;

forming a through-hole by piercing a flat portion as a portion where the flat shape is maintained or a stretch-formed-side top portion of the intermediate stretch-formed portion; and forming the flat portion after the through-hole is formed in the flat portion into a stretch-formed portion of a predetermined height, or forming the intermediate stretch-formed portion after the through-hole is formed in the intermediate stretch-formed portion into the stretch-formed portion of the predetermined height that is greater than the intermediate forming height.

(2) The method for manufacturing a press-formed product according to the above (1), wherein the blank sheet is a sheet member having a sheet thickness of 0.5 mm or less.

(3) The method for manufacturing a press-formed product according to the above (1) or the above (2), wherein:

the planned outline portion includes a flat planned flat outline portion as a planned portion for a flat outline portion; and after the planned outline portion is formed from the blank sheet, the manufacturing intermediate is carried from a press forming machine that forms the planned outline portion to a different press forming machine that is used in a downstream process after the planned outline portion is formed, by carrying the manufacturing intermediate while supporting the planned flat outline portion using a carrier machine.

(4) The method for manufacturing a press-formed product according to any one of the above (1) to the above (3), wherein, after the planned outline portion is formed from the blank sheet, the planned outline portion is made into the outline portion by subjecting the planned outline portion to finishing work that includes a restriking process.

(5) The method for manufacturing a press-formed product according to any one of the above (1) to the above (4), wherein a shape of an outer circumferential portion of the stretch-formed portion is a polygon.

(6) The method for manufacturing a press-formed product according to the above (5), wherein the intermediate forming height is less than one half of a height of the stretch-formed portion.

(7) The method for manufacturing a press-formed product according to the above (5) or the above (6), wherein:
the outer circumferential portion of the stretch-formed portion is formed in an M-sided shape (M is an integer of 3 or more);
an edge portion of the through-hole is formed in an N-sided shape (N is an integer of 3 or more); and
M is equal to N, and a position of a corner portion of the outer circumferential portion and a position of a corner portion of the edge portion are caused to deviate in a circumferential direction of the through-hole.

(8) The method for manufacturing a press-formed product according to the above (7), wherein the corner portion of the edge portion is arranged at a position corresponding to one half of an angular pitch between two corner portions which are adjacent to each other of the outer circumferential portion in the circumferential direction.

(9) The method for manufacturing a press-formed product according to any one of the above (5) to the above (8), wherein:
a shape of the edge portion is a regular polygon;
each corner portion of the regular polygon of the edge portion is formed in an arc shape; and
when a radius of curvature of the arc shape is defined as "a", and a distance from a center of the through-hole to a midpoint of any one side of the edge portion is defined as "b", $0.3 \leq a/b \leq 1.0$.

(10) The method for manufacturing a press-formed product according to any one of the above (1) to the above (4), wherein a shape of an outer circumferential portion of the stretch-formed portion is circular.

(11) The method for manufacturing a press-formed product according to the above (10), wherein the intermediate forming height is greater than one half of a height of the stretch-formed portion and is less than the height.

(12) The method for manufacturing a press-formed product according to the above (10) or the above (1), wherein an edge portion of the through-hole is circular.

Advantageous Effects of Invention

According to the present invention, occurrence of forming defects, such as cracks, in a starting material during press forming can be suppressed, and occurrence of problems in a case of transferring a starting material during press forming can be suppressed.

BRIEF DESCRIPTION OF DRAWINGS

FIG. 9(A) is a schematic cross-sectional view illustrating the blank sheet and the principal part of a press forming machine in a process of (i). FIG. 9(B) is a schematic cross-sectional view of the principal part that illustrates press working in the process of (i) by the press forming machine.

FIG. 10(A) is a perspective view of a manufacturing intermediate after the process of (i). FIG. 10(B) is a schematic perspective view illustrating a state in which a vacuum carrier machine is attached to the manufacturing intermediate after the process of (i), in which illustration of a part of the vacuum carrier machine is omitted.

FIG. 11(A) is a schematic cross-sectional view illustrating the manufacturing intermediate and the principal part of the press forming machine in a process of (ii). FIG. 11(B) is a schematic cross-sectional view of the principal part that illustrates piercing work in the process of (ii). FIG. 11(C) is a schematic perspective view of the manufacturing intermediate that underwent the process of (ii) (piercing).

FIG. 12(A) is a schematic cross-sectional view illustrating the manufacturing intermediate and a principal part of a press forming machine in a process of (iii). FIG. 12(B) is a schematic cross-sectional view of the principal part that illustrates processing of a stretch-formed portion by the press forming machine in the process of (iii).

FIG. 13(A) is a schematic cross-sectional view illustrating the manufacturing intermediate and a principal part of a press forming machine in a process of (iv). FIG. 13(B) is a schematic cross-sectional view of the principal part that illustrates a restriking process performed by the press forming machine in the process of (iv).

FIG. 14(A) is a schematic cross-sectional view illustrating the manufacturing intermediate and a principal part of a press forming machine in a process of (v). FIG. 14(B) is a schematic cross-sectional view of the principal part that illustrates forming by the press forming machine in the process of (v).

FIG. 16(A) is a schematic perspective view illustrating the stretch-formed portion when the stretch-formed portion is formed from a blank without forming a through-hole. FIG. 16(B) is a graph illustrating the relation between a position on a line O-O' and maximum principal strain with respect to the stretch-formed portion illustrated in FIG. 16(A).

FIG. 17(A) is a schematic perspective view illustrating the stretch-formed portion when the stretch-formed portion is formed after a through-hole is formed in a blank. FIG. 17(B) is a graph illustrating the relation between a position on a line O-O' and maximum principal strain with respect to the stretch-formed portion illustrated in FIG. 17(A).

FIG. 18(A) is an enlarged view of the press forming machine. FIG. 18(B) is a schematic cross-sectional view for describing finished quality of the through-hole.

FIG. 20 illustrates a modification of a shape of an edge portion of the through-hole in the stretch-formed portion, in which FIG. 20(A) is a plan view illustrating one stretch-formed portion, and FIG. 20(B) is a graph illustrating the relation between a ratio a/b between a radius of curvature "a" of each corner portion of the edge portion of the through-hole and a distance "b" from the center of the through-hole to a midpoint of one side of the edge portion of the through-hole, and a forming limit height.

FIG. 21 is a view illustrating a modification of the stretch-formed portion, in which FIG. 21(A) is a schematic plan view of a principal part, and FIG. 21(B) is a cross-sectional view along a line XXIB-XXIB in FIG. 21(A).

DESCRIPTION OF EMBODIMENT

Figure 1:
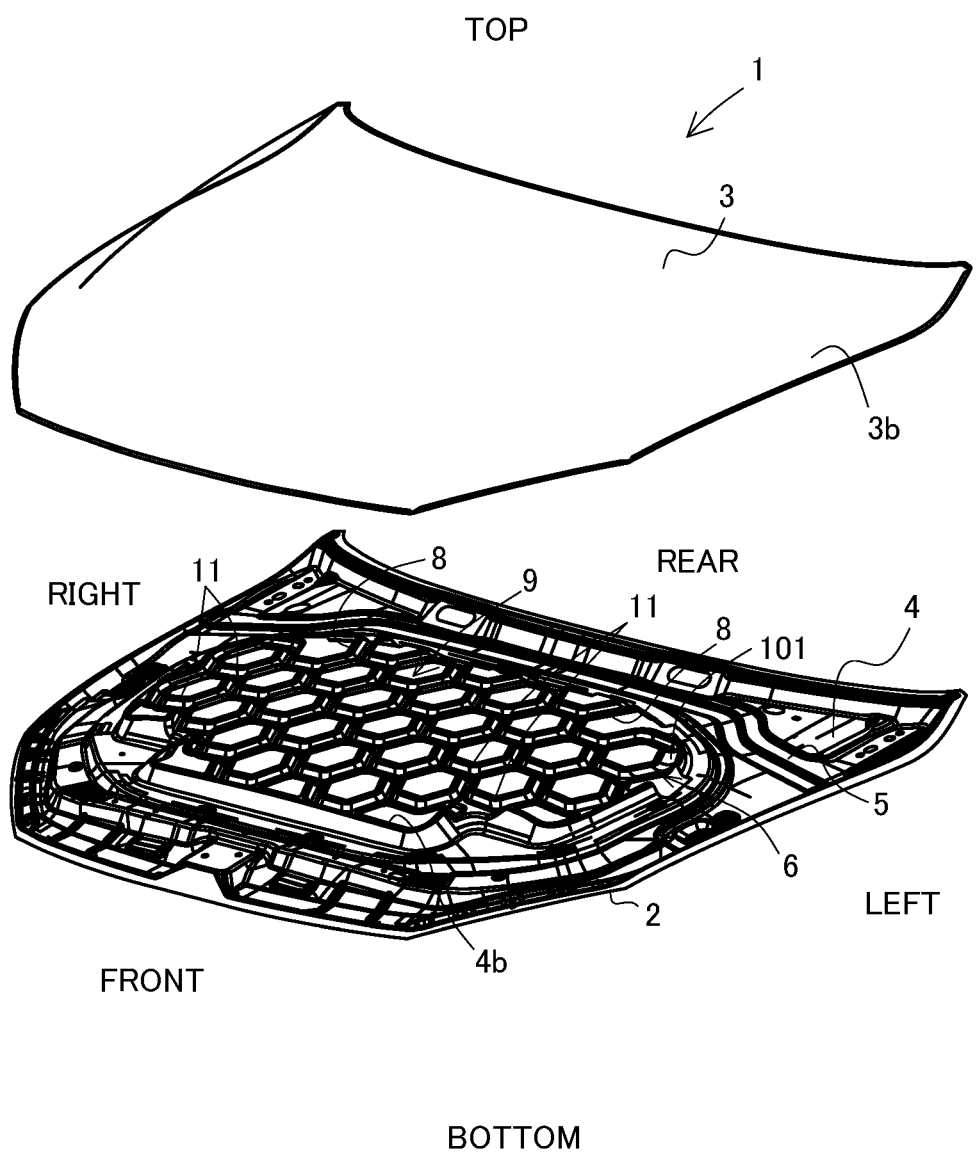
FIG. 1 is a schematic exploded perspective view of an automobile panel according to one embodiment of the present invention.

Hereunder, first, the circumstances leading to the conception of the present invention will be described, and then an embodiment will be described in detail.
[Circumstances Leading to Conception of Present Invention]
The present invention has been arrived during the course of diligent research for the purpose of securing panel rigidity and dent resistance while achieving a reduction of thickness and weight with respect to press-formed products such as an inner panel and an outer panel of an automobile hood or the like.

In the present description, the term "panel rigidity" refers to, in a case where a force from outside acts on a press-formed product, for example, an outer panel of an automobile hood which has a comparatively moderately curving surface and in which the surface area is extremely large relative to the sheet thickness, the rigidity of the outer panel. The panel rigidity is an index representing the degree to which it is difficult to deflect the outer panel. For example, if the panel rigidity is high, the outer panel is difficult to deflect when a hand is placed on the outer panel. The panel rigidity corresponds to a feeling of elastic resistance or a sensation of flexural deformation when the outer panel is pressed with a hand. This characteristic is usually represented by the deflection when a load is applied, and the smaller that the deflection is when a constant load is applied, the higher that the panel rigidity is.

In the present description, dent resistance is an index of the difficulty of producing permanent strain which remains after the relevant part is strongly pressed (an index representing the difficulty of forming a dent flaw). For example, when an outer panel is pressed down strongly, a dent flaw will easily be formed if the dent resistance is low. Further, if the dent resistance is low, when the outer panel is hit with a pebble or the like, a dent flaw will be easily formed. The term "dent resistance" refers to the difficulty for an indentation (dent) to be left after removing the load in a case where a localized load is applied to the outer panel for some reason. In a case of the body of an actual automobile, such dents occur when an outer panel of a door or the like is strongly pressed with a finger or the palm of a hand, or when the automobile body is hit by a flying stone while travelling and the like. A dent is formed as a result of a place on the outer panel at which a load has been applied plastically deforming. Therefore, when the strain on the outer panel at a time that a load is applied thereto reaches a certain magnitude, the strain remains even after the load is removed, and a dent occurs. The minimum value of a load that causes a certain residual strain in the outer panel is referred to as a "dent load", and the larger the dent load is, the better the dent resistance is.

In an automobile panel, the thinner the sheet thickness of the panel is made, the greater the degree to which both the panel rigidity and the dent resistance decrease. Further, with regard to automobile panels, it cannot be said that conventionally improvements have been made mainly from the viewpoint of securing panel rigidity while achieving a reduction in weight. Moreover, it cannot be said that improvements have been made mainly from the viewpoint of securing both panel rigidity and dent resistance.

From the above point of view, the inventors of the present application conceived of the idea of providing, in an inner panel, a honeycomb shape in which side lengths are short in comparison to the length of one side of the inner panel. In order to form such a honeycomb shape, usually the following processes 1) and 2) are performed.

Process 1) The overall shape of the member including a high-rigidity shape portion is formed by draw forming.

Process 2) In the high-rigidity shape portion, piercing (punching) is performed to remove regions that are not required as the final product.

Further, during these processes, restriking such as working a loosely shaped portion into the final product shape and trimming of unnecessary peripheral portions, and the like are performed.

However, in the usual method described above, in process 1), when forming the high-rigidity shape, the ductility of the material when the material is stretch-formed is insufficient due to the deep shape, and a rupture is liable to occur in the material. Therefore, as a result of diligent studies, the inventors of the present application conceived of changing the deformation mode of a stretch-form having a high-rigidity shape. That is, the inventors of the present application investigated improving the formability not by stretch-forming, but by changing to hole expansion forming.

As a result of diligent studies it has been found that the formability improves by performing piercing work before stretch-forming or in the course of stretch-forming with respect to the high-rigidity shape to thereby change the deformation mode to hole expansion forming. As a result of further detailed investigation, for maximizing the advantageous effect of improving the formability, it has been found that the timing for performing piercing is favorable at the initial stage of forming the high-rigidity shape in a case where the plan view shape is non-axisymmetric, for example, a hexagonal honeycomb shape or a quadrilateral shape, while in contrast, the timing for performing piercing is favorable in a later stage of forming the high-rigidity shape in a case where the plan view shape is an axisymmetric circular shape.

In addition, by examining the practicability of a configuration for press forming an inner panel or the like using a thin sheet, the inventors of the present application obtained the finding that a problem exists with respect to carrying the starting material when performing press forming of the starting material. Specifically, as mentioned above, in a press forming process for manufacturing a press-formed product, in some cases a starting material which is in the course of being formed may be transferred in sequence between a plurality of press forming machines for every one or plurality of processes to form the starting material into a press-formed product. Therefore, when transferring a thin sheet between press forming machines, care must be taken to ensure that the starting material is not subjected to an unwanted external force and deformed. For example, in the case of transferring a thin sheet while sucking the starting material by using a vacuum carrier machine, in practice suction ports of the vacuum carrier machine cannot suck the whole area of the surface of the starting material, and the starting material is transferred while the suction ports suck a part of the starting material. Therefore, in some cases a part of the starting material that is separated from the suction port may deflect downward due to its own weight, and an unintended deformation may occur. If such a deformation occurs, the dimensional accuracy of the press-formed product will decrease, and it will also lead to a decrease in productivity.

Further, as described above, in the case of forming a honeycomb shaped portion in an inner panel, it has been extremely difficult to automatically carry a perforated blank. That is, when performing automatic carrying of a blank that is thin and has low rigidity, the blank is liable to slip off from the carrier jig while being carried. Further, even in a case where a perforated blank does not slip off from a vacuum machine, there are many cases where a suction port of the vacuum machine cannot be attached to a perforated portion. As a result, breakage may occur due to the perforated portion of the honeycomb shape deflecting, resulting in the problem that the starting material cannot be carried. That is, it has been found that if a large number of holes are merely formed by piercing work when the material is in the state of a blank, it may not be possible to perform automatic transfer in mass production press forming machines.

While obtaining the above findings, the inventors of the present application conducted diligent studies with respect to methods for suppressing a decrease in panel rigidity and also a decrease in dent resistance which are caused by thinning the walls of an outer panel, and also conducted diligent studies with respect to methods for suppressing the occurrence of problems such as an unintended deformation in a starting material when carrying the starting material during press forming. As a result, the inventors of the present application established the method for manufacturing a press-formed product of the present invention.

Description of Embodiment

Hereunder, an embodiment of the present invention is described while referring to the accompanying drawings. In the present embodiment, an automobile panel is described as one example of a press-formed product. More specifically, an automobile hood inner is described as one example of an automobile panel. Note that, the press-formed product of the present invention is not limited to an automobile hood inner, and can be exemplified by a panel component for use as an automobile outer skin panel including an inner panel and an outer panel, for example, a quarter panel stiffening member or a door panel (door inner panel, door outer panel). Further, the press-formed product of the present invention can also be used as a press-formed product constituting a structure other than an automobile.

Figure 2:
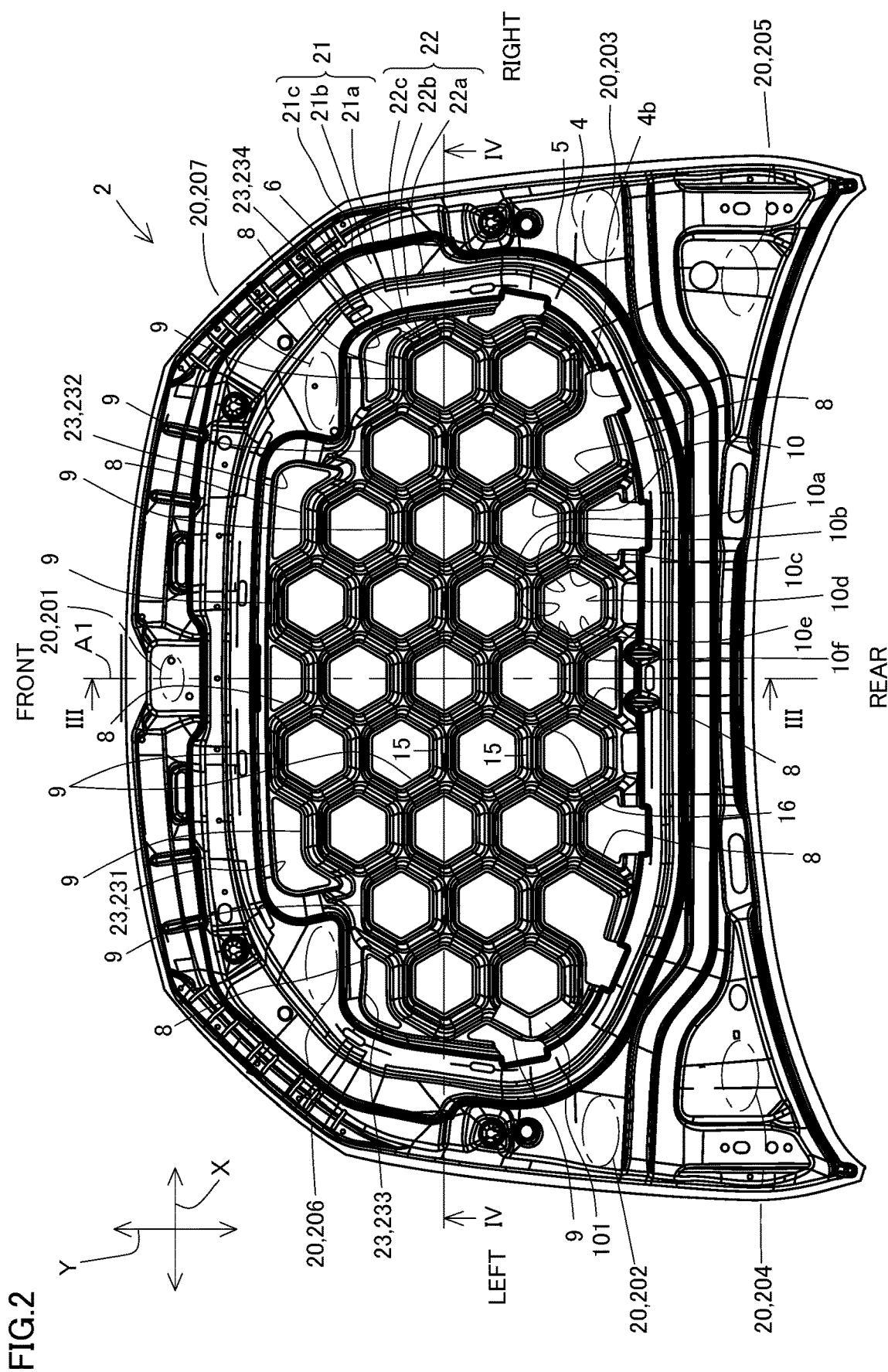
FIG. 2 is a plan view of an inner panel of the automobile panel.
Figure 3:
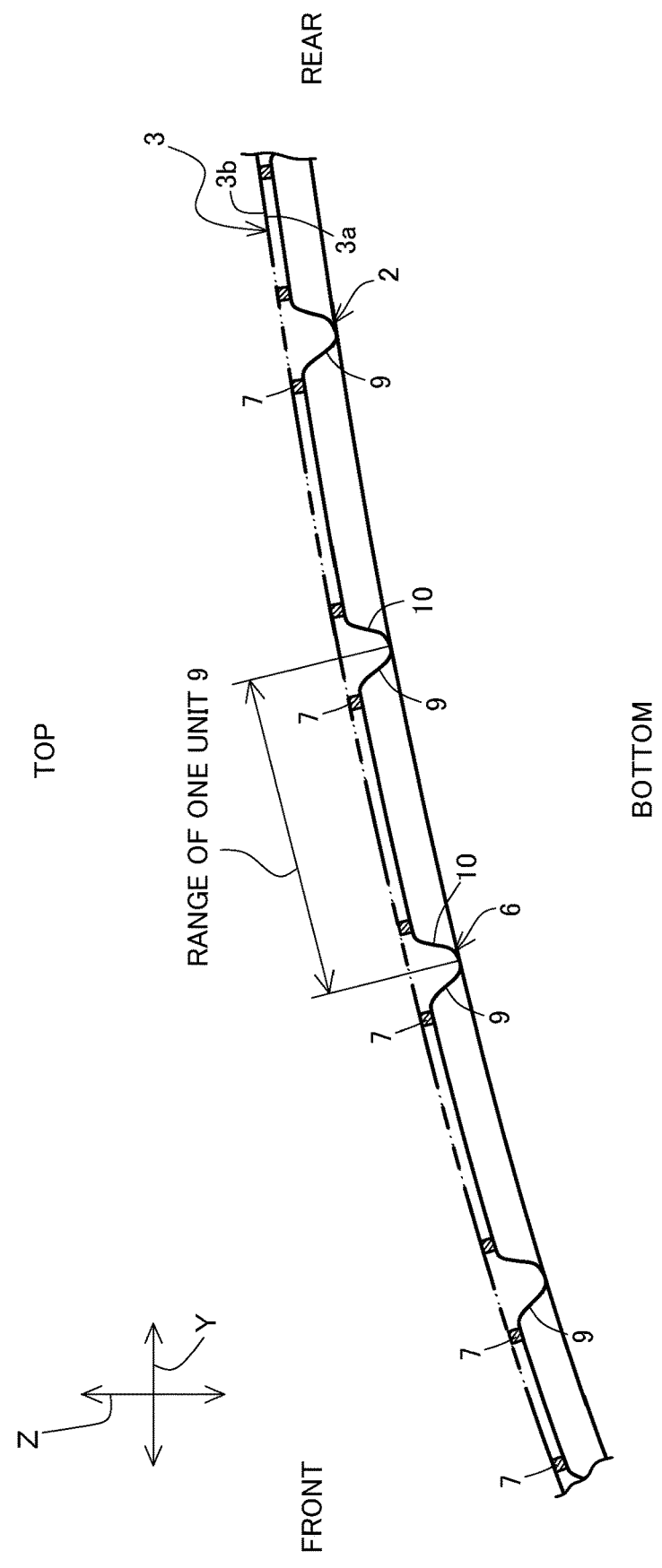
FIG. 3 is a schematic cross-sectional view along a line III-III in FIG. 2.
Figure 4:
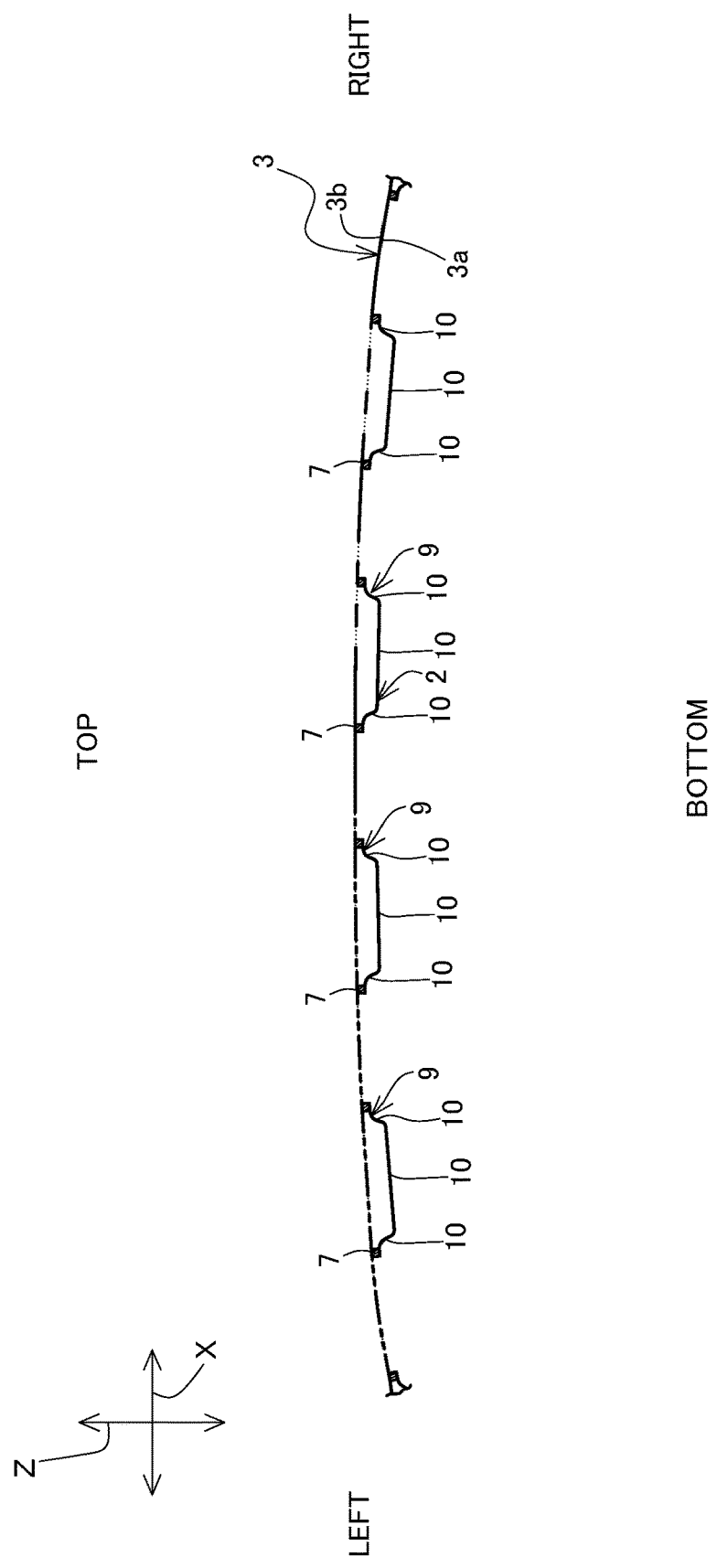
FIG. 4 is a cross-sectional view along a line IV-IV in FIG. 2, in which illustration of a portion that appears to the rear of the cross-section is omitted.

FIG. 1 is a schematic exploded perspective view of an automobile panel 1 according to one embodiment of the present invention. FIG. 2 is a plan view of an inner panel 2 of the automobile panel 1. FIG. 3 is a schematic cross-sectional view along a line III-III in FIG. 2. FIG. 4 is a cross-sectional view along a line IV-IV in FIG. 2, in which illustration of a portion that appears to the rear of the cross-section is omitted. Note that, in FIG. 3 and FIG. 4, an outer panel 3 that does not appear in FIG. 2 is indicated by a chain double-dashed line that is a virtual line.

Figure 5:
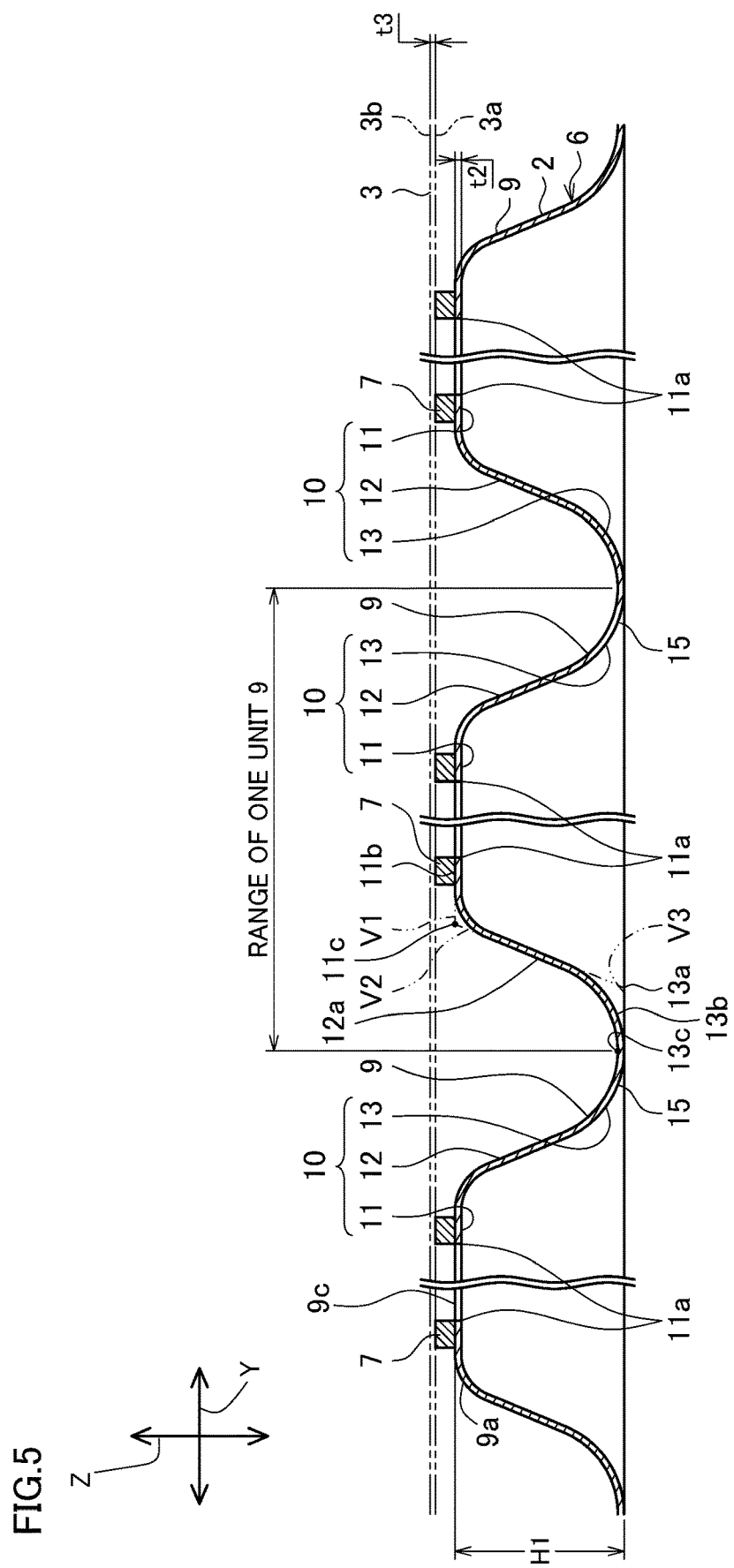
FIG. 5 is a view in which one part of FIG. 3 is enlarged.
Figure 6:
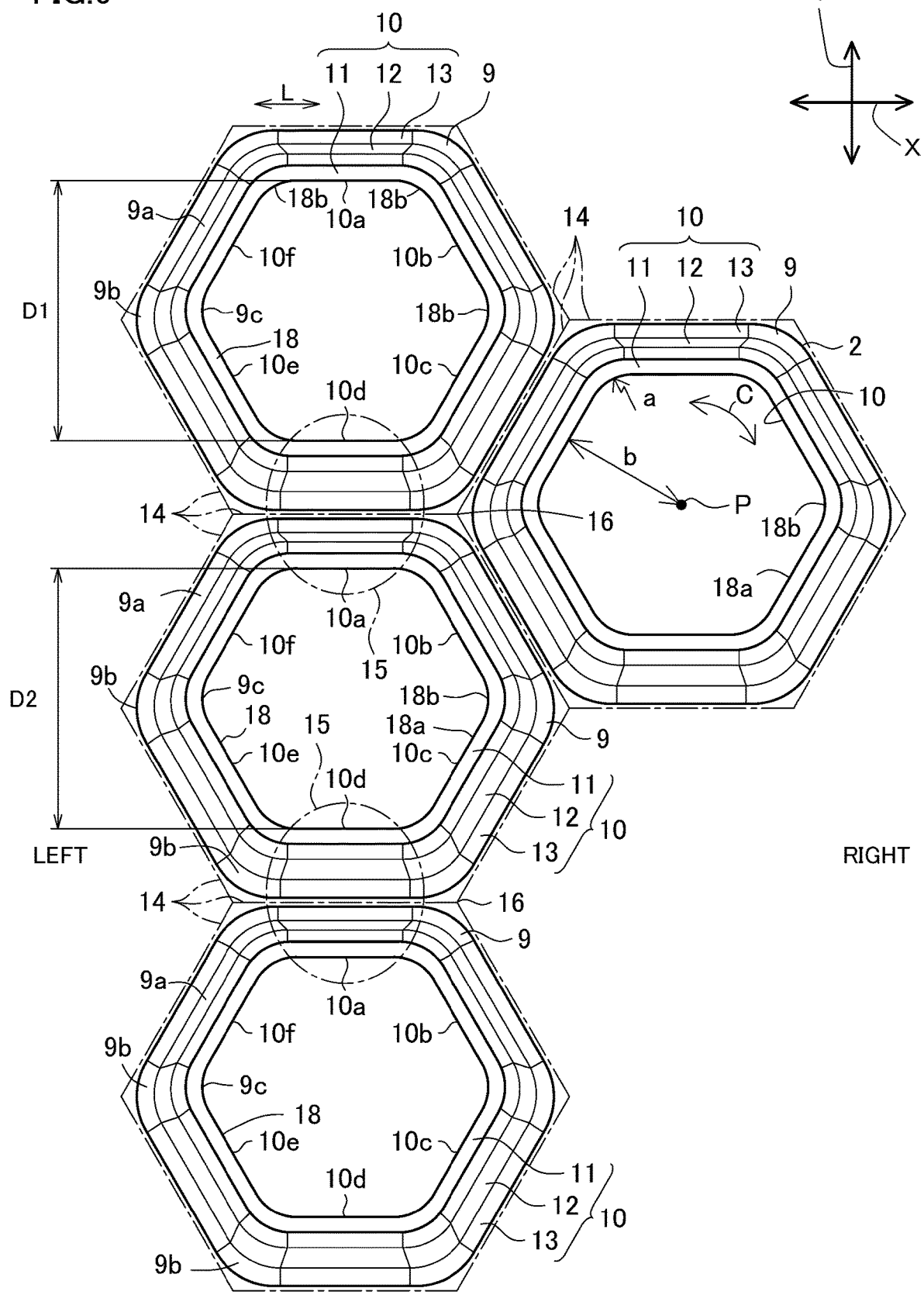
FIG. 6 is a plan view in which one part of the inner panel is enlarged.
Figure 7:
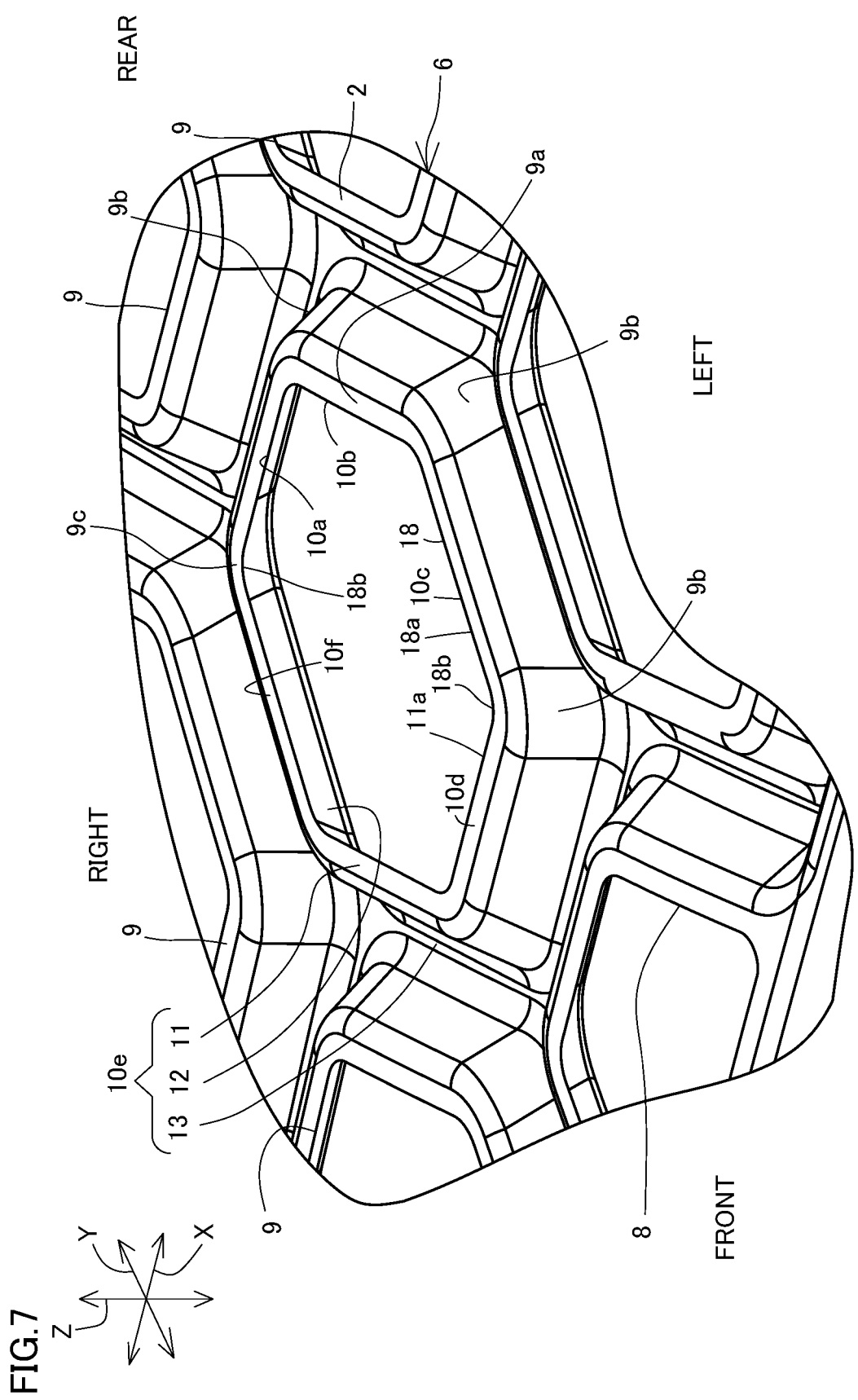
FIG. 7 is a perspective view in which the periphery of an stretch-formed portion of the inner panel is enlarged.

FIG. 5 is view in which one part of FIG. 3 is enlarged. FIG. 6 is a plan view in which one part of the inner panel 2 is enlarged. FIG. 7 is a perspective view in which the periphery of one stretch-formed portion 9 of the inner panel 2 is enlarged. Hereinafter, unless otherwise specified, the embodiment will be described with reference to FIG. 1 to FIG. 7 as appropriate.

The automobile panel 1 is a front hood provided at the front part of an automobile, and is also called a "bonnet". An automobile in which the automobile panel 1 is provided is, for example, a passenger vehicle. A sedan-type passenger vehicle, a coupe-type passenger vehicle, a hatchback-type passenger vehicle, a minivan-type passenger vehicle, an SUV— (Sport Utility Vehicle) type passenger vehicle and the like can be mentioned as examples of the passenger vehicle.

Note that, in the present description, the terms "front", "rear", "left", "right", and "upper" and "lower" are used taking a time when the automobile panel 1 is mounted to an automobile and the automobile panel 1 is closed as the basis. The term "front" refers to a direction in which the automobile advances. The term "rear" refers to a direction in which the automobile reverses. The term "right" refers to a turning direction of the automobile when the automobile which is advancing turns to the right. The term "left" refers to a turning direction of the automobile when the automobile which is advancing turns to the left. Further, in the present embodiment, a vehicle width direction of the automobile to which the automobile panel 1 is mounted is referred to as a "width direction X". Further, a vehicle length direction of the automobile to which the automobile panel 1 is mounted is referred to as a "longitudinal direction Y". Furthermore, a vehicle height direction of the automobile to which the automobile panel 1 is mounted is referred to as a "height direction Z".

The automobile panel 1 has an automobile inner panel 2, an automobile outer panel 3 that is supported by the automobile inner panel 2, and a joint 7 that joins the automobile outer panel 3 and the inner panel 2. Note that, in the following, the automobile inner panel 2 is referred to simply as the inner panel 2, and the automobile outer panel 3 is referred to simply as the outer panel 3.

In the automobile panel 1, the outer panel 3 is a portion that constitutes a part of the outer surface of the automobile. The outer panel 3 is formed of, for example, a metal material such as a mild steel sheet or a high-tensile strength steel sheet. Examples of the high-tensile strength steel sheet that can be mentioned include steel sheets having a tensile strength of 340 MPa or more, for example, a steel sheet having a tensile strength of 590 MPa or more. The outer panel 3 is formed, for example, by subjecting a single steel sheet to press working or the like. A sheet thickness t3 of the outer panel 3 (thickness of the steel sheet) is set to 0.6 mm or less, preferably is set to 0.5 mm or less, and more preferably is set to 0.4 mm or less. The thinner the sheet thickness t3 of the outer panel 3 is made in this way, the lighter the automobile panel 1 can be made. The lower limit of the sheet thickness t3 of the outer panel 3 is, for example, 0.1 mm.

There are no particular restrictions with regard to the shape of the outer panel 3. Note that, in the present embodiment, the outer panel 3 has a shape in which the central portion is upwardly convex in the height direction Z.

The inner panel 2 reinforces the outer panel 3 by being joined to an undersurface 3a of the outer panel 3. By this means, the inner panel 2 increases the panel rigidity of the outer panel 3. In addition, in the present embodiment, the inner panel 2 increases the dent resistance of the outer panel 3. That is, in the present embodiment, the panel rigidity and the dent resistance of the outer panel 3 are secured not by increasing the sheet thickness of the outer panel 3, but rather are secured by the shape of the inner panel 2. The inner panel 2 is formed, for example, of a metal material such as a steel sheet. The inner panel 2 is formed, for example, by subjecting a single steel sheet to press working. The inner panel 2 may be an integrally formed product, or may be formed by joining a plurality of members together. In the present embodiment, the inner panel 2 is an integrally formed product. A sheet thickness t2 of the inner panel 2 (thickness of the steel sheet) is preferably within the range of 0.3 mm to 0.6 mm. The sheet thickness t2 of the inner panel 2 may be less than the sheet thickness t3 of the outer panel 3, may be the same as the sheet thickness t3 of the outer panel 3, or may be greater than the sheet thickness t3 of the outer panel 3.

The inner panel 2 has an outer circumferential portion 4 in which an outline portion 5 is provided, and a stretch-formed structure 6 disposed so as to be surrounded by the outline portion 5.

The outer circumferential portion 4 is an outer circumferential part of the inner panel 2. When the outer panel 3 closes the engine room, the outer circumferential portion 4 of the inner panel 2 is received by the automobile body (not illustrated) together with the outer circumferential portion of the outer panel 3. By this means, a load that acts on an upper face 3b of the outer panel 3 is received by the automobile body through the inner panel 2.

The outline portion 5 of the outer circumferential portion 4 is a three-dimensionally shaped portion that forms the outline of the outer circumferential portion 4 of the inner panel 2, and is a portion at which the bending rigidity is enhanced among the entire outer circumferential portion 4 of the inner panel 2. In the present embodiment, the outline portion 5 is formed over the entire area in the circumferential direction of the outer circumferential portion of the inner panel 2. Note that, the outline portion 5 may be formed only at one part in the circumferential direction of the outer circumferential portion 4 of the inner panel 2. The outline portion 5 includes a portion with a shape that rises and falls in the height direction Z as the position thereof moves in the horizontal direction over the inner panel 2. The specific shape of the outline portion 5 is not limited as long as the outline portion 5 includes an undulating shape that suppresses flexural deformation of the outer circumferential portion 4 in the downward direction when the outer circumferential portion 4 of the inner panel 2 receives a load which deflects the outer circumferential portion 4 downward due to a flat portion or the stretch-formed structure 6 of the inner panel 2 being lifted.

In the present embodiment, the outline portion 5 has a flat outline portion 20, a first pedestal 21, and a second pedestal 22 which is formed on the first pedestal 21 and supports the stretch-formed structure 6.

The flat outline portion 20 is a portion to be sucked which can be sucked by a vacuum cup 51, described later, for carrying. It suffices that the flat outline portion 20 has an area and flatness (small change in height in the height direction Z when moving in the width direction X and the longitudinal direction Y) which the vacuum cup 51 is capable of sucking. In the present embodiment, the flat outline portion 20 is arranged at seven locations, and the flat outline portions 20 (201 to 207) are provided as flat outline portions.

A plurality of the flat outline portions 20 are arranged on an outer circumferential side portion of the inner panel 2 (outside of the first pedestal 21), and in the present embodiment are formed at five locations. The flat outline portion 201 is formed at a location which is at a front end portion and is at the center in the width direction X of the inner panel 2, and is a location to which a bonnet striker is connected. In the present embodiment, the flat outline portions 202 and 203 are arranged in the vicinity of the rear end of the stretch-formed structure 6 in the longitudinal direction Y, and are positioned so as to sandwich the stretch-formed structure 6 in the width direction X. In the present embodiment, the flat outline portions 204 and 205 are arranged at a rear end portion of the inner panel 2 in the longitudinal direction Y, and are positioned in the vicinity of both end portions of the inner panel 2 in the width direction X.

A plurality of the flat outline portions 20 are also arranged at a portion (in the present embodiment, the second pedestal 22) near the inner circumference of the inner panel 2, and in the present embodiment are formed at two locations. The flat outline portions 206 and 207 are arranged at positions which, in plan view, are advanced toward the center of the inner panel 2 from the positions of the flat outline portions 201 to 205. Note that, the phrase "center of the inner panel 2" refers to the center of the figure of the inner panel 2 when the inner panel 2 is viewed in plan view. In the present embodiment, the flat outline portions 206 and 207 are arranged in the vicinity of the front end of the stretch-formed structure 6 in the longitudinal direction Y, and are positioned so as to sandwich the stretch-formed structure 6 in the width direction X.

Note that, although in the present embodiment a configuration in which the flat outline portions 201 to 207 are provided is described as an example, a different configuration may also be adopted. It suffices that the number of the flat outline portion 20 is at least two, and may be three. The flat outline portions 20 are arranged so that, in plan view of the inner panel 2, the starting material of the inner panel 2 can be lifted up by the vacuum cups 51 with a little deflection.

The first pedestal 21 includes a wall portion 21a that rises in the height direction Z, and a flat top plate 21b that extends from the upper end of the wall portion toward the center of the inner panel 2. The first pedestal 21 is formed in an endless annular shape in plan view. An outer circumferential edge portion 21c of the first pedestal 21 is shown by a thick line in FIG. 2. The second pedestal 22 is supported by an inner circumferential edge portion of the top plate 21b of the first pedestal 21.

The second pedestal 22 includes a wall portion 22a that rises in the height direction Z from the top plate 21b, and a flat top plate 22b that extends from the upper end of the wall portion 22a toward the center of the inner panel 2. The second pedestal 22 is formed in an endless annular shape in plan view. The flat outline portions 206 and 207 are formed on the top plate 22b of the second pedestal 22. An inner circumferential edge portion 22c of the top plate 22b of the second pedestal 22 is shown by a thick line in FIG. 2. The stretch-formed structure 6 is supported by the top plate 22b.

The stretch-formed structure 6 has a three-dimensional structure which is provided in order to receive a load acting on the upper face 3b of the outer panel 3. The stretch-formed structure 6 has a configuration in which members that have a hat-shaped cross section (a V-shaped cross section or a U-shaped cross section) are combined.

The stretch-formed structure 6 has a plurality of incomplete stretch-formed portions 8 and a plurality of reinforcing stretch-formed portions 23 (231 to 234) which are adjacent to the top plate 22b of the second pedestal 22 (an inner circumferential edge portion 4b of the outer circumferential portion 4) and are continuous with the top plate 22b, and a plurality of stretch-formed portions 9.

The incomplete stretch-formed portion 8 has a configuration equivalent to a configuration in which one portion of the stretch-formed portion 9 has been cut off along the circumferential direction of the polygonal (in the present embodiment, hexagonal) stretch-formed portion 9. The incomplete stretch-formed portion 8 has a side portion that is similar to a partial unit 10, to be described later, of the stretch-formed portion 9. The side portion is continuous with the top plate 22b.

In the present embodiment, the reinforcing stretch-formed portions 23 are arranged at four locations near the front portion of the stretch-formed structure 6, and are formed so as to reinforce the inner circumferential region of the top plate 22b of the second pedestal 22 in plan view. The reinforcing stretch-formed portion 231 and 232 are arranged symmetrically in the width direction X at the front end of the top plate 22b. The reinforcing stretch-formed portions 233 and 234 are arranged symmetrically in the width direction X at positions which are advanced rearward in the longitudinal direction Y from the reinforcing stretch-formed portions 231 and 232. Each of the reinforcing stretch-formed portions 231 to 234 has an inclined wall that rises upward from the top plate 22b, and a flange that is formed at the upper end of the inclined wall.

Each stretch-formed portion 9 is formed in a polygonal (in the present embodiment, hexagonal) annular shape in plan view in the height direction Z. Hereinafter, when simply the term "plan view" is used, it means a plan view in the height direction Z. By forming each stretch-formed portion 9 in an annular polygonal shape, the inner panel 2 can be made lightweight and the inner panel 2 can also be provided with high rigidity.

In the present embodiment, each stretch-formed portion 9 is formed in the shape of a substantially regular hexagon with rounded corners. The term "regular hexagon" means a hexagon in which the lengths of the respective sides are equal and the interior angles are also a constant angle of 120 degrees. Further, in the present description, the term "substantially regular hexagon" refers to a hexagon that can be treated as a regular hexagon from the viewpoint of the panel rigidity and the viewpoint of the dent resistance of the outer panel 3. The respective stretch-formed portions 9 are formed so that the shape of each stretch-formed portion 9 is substantially the same. Note that, the term "substantially the same" in this case indicates that the configuration is the same except in the respect that the shape of each stretch-formed portion 9 is caused to match a shape which matches the curved shape of the outer panel 3.

Each stretch-formed portion 9 may also be formed in the shape of a hexagon that is other than a regular hexagon. Examples of a hexagon other than a regular hexagon that can be mentioned include a hexagon in which the lengths of the respective sides are not uniform, and a hexagon in which the interior angles are not uniform at 120 degrees. Examples of a hexagon in which the lengths of the respective sides are not uniform that can be mentioned include a hexagon in which the length of a front end side and the length of a rear end side are set to a predetermined first length, and which has four sides whose lengths are each set to a predetermined second length that is different from the first length.

The stretch-formed structure 6 has a structure in which a plurality of the stretch-formed portions 9 having a hexagonal annular shape are disposed in a close-packed arrangement. In this case, the term "close-packed" means that a plurality of the stretch-formed portions 9 that are adjacent to each other are arranged without a gap therebetween. Specifically, each stretch-formed portion 9 is partitioned off from the other stretch-formed portions 9 by stretch-formed portion boundaries 14 that are described later. As illustrated in FIG. 6, a front end 13c (lower end) of a bottom portion 13 forms a boundary of the bottom portion 13 that includes the front end 13c, to thereby form the stretch-formed portion boundary 14. The stretch-formed portion boundary 14 is formed in a hexagonal shape in plan view. By having such a structure in which the stretch-formed portions 9 are disposed in a close-packed hexagonal arrangement, the stretch-formed structure 6 can withstand loads in substantially the same manner from all directions including the height direction Z over the whole area in plan view.

In a case where flanges 11, described later, of the stretch-formed portions 9 are disposed in a close-packed arrangement, preferably a plurality of the stretch-formed portions 9 are the same shape. Further, the stretch-formed portions 9 that have similar forms to each other and have differing shapes may be disposed in a close-packed arrangement. Note that, in the stretch-formed structure 6, the stretch-formed portions 9 need not be disposed in a close-packed arrangement, and another portion may be formed between the stretch-formed portions 9 and 9 that are adjacent.

In the present embodiment, the plurality of stretch-formed portions 9 are formed symmetrically in the width direction X as a whole. For example, in the present embodiment, three of the stretch-formed portions 9 are arranged side by side in the front-to-rear direction at the center in the width direction X. Further, in plan view, the plurality of stretch-formed portions 9 are arranged symmetrically in the width direction X with reference to a virtual line A1 extending in the front-to-rear direction through the center of the three stretch-formed portions 9 in the width direction X. Note that, the arrangement of the stretch-formed portions 9 is not limited to this configuration, and because the panel rigidity, the dent resistance and the mass do not depend on the direction of the stretch-formed portions 9, there is no constraint on the direction of the stretch-formed portions 9.

In the present embodiment, in the direction toward the right side from the aforementioned three stretch-formed portions 9 arranged at the central position in the width direction X, in the following order, four stretch-formed portions 9 which are arranged side by side in the longitudinal direction Y are provided, three stretch-formed portions 9 which are arranged side by side in the longitudinal direction Y are provided, two stretch-formed portions 9 which are arranged side by side in the longitudinal direction Y are provided, and two stretch-formed portions 9 which are arranged side by side in the longitudinal direction Y are provided. Furthermore, similarly to the foregoing arrangement, in the direction toward the left side from the aforementioned three stretch-formed portions 9 arranged at the central position in the width direction X, in the following order, four stretch-formed portions 9 which are arranged side by side in the longitudinal direction Y are provided, three stretch-formed portions 9 which are arranged side by side in the longitudinal direction Y are provided, two stretch-formed portions 9 which are arranged side by side in the longitudinal direction Y are provided, and two stretch-formed portions 9 which are arranged side by side in the longitudinal direction Y are provided.

Each of the stretch-formed portions 9 has six of the partial units 10 (10*a* to 10*f*). In the present embodiment, in each of the stretch-formed portions 9, a front partial unit 10*a* and a rear partial unit 10*d* extend along the width direction X, respectively. Further, in each of the stretch-formed portions 9, the remaining four partial units 10 extend in a direction that inclines with respect to the longitudinal direction Y in plan view. The stretch-formed portion 9 that has a polygonal shape is formed by the plurality of partial units 10 in this way.

As illustrated clearly in FIG. 5 to FIG. 7, each of the partial units 10 (10*a* to 10*f*) has a flange 11, an inclined wall 12 continuous with the flange 11, and the bottom portion 13 that is continuous with the inclined wall 12 and is separated from the flange 11.

The flange 11 is adjacent to the outer panel 3, and in the partial unit 10, the flange 11 is a portion that is arranged closest to the outer panel 3. The flange 11 is a strip-shaped portion. In a single stretch-formed portion 9, the flanges 11 of six of the partial units 10*a* to 10*f* form a hexagonal flange as a whole. Further, inner end parts 11*a* of six of the flanges 11 constitute an annular end part as a whole. That is, a through-hole 18 is formed by the inner end parts 11*a* of six of the flanges 11. The width (width at a cross section orthogonal to a longitudinal direction L of the partial unit 10) of an upper face 11*b* of the flange 11 is the distance between the inner end part 11*a* and an outer end part 11*c* of the flange 11. In a cross section (cross section illustrated in FIG. 5) orthogonal to the longitudinal direction L of the partial unit 10, the outer end part 11*c* is an intersection point between a virtual line V1 including the upper face 11*b* (rectilinear portion) of the flange 11 and a virtual line V2 including an intermediate portion (rectilinear portion) of an upper face 12*a* of the inclined wall 12. In a case where the flange 11 and the inclined wall 12 are connected in a curved shape as in the present embodiment, the outer end part 11*c* is a virtual end part. On the other hand, in a case where the flange 11 and the inclined wall 12 are connected in a linearly pointed shape, the outer end part 11*c* is the connecting point between the flange 11 and the inclined wall 12. In the flange 11, the width of the upper face 11*b* to which the joint 7 can be applied is preferably 2 mm or more from the viewpoint that a sufficient amount of the joint 7 can be provided.

In the cross section orthogonal to the longitudinal direction L of the partial unit 10, an inner end part 13*a* of the bottom portion 13 is an intersection point between a virtual line V3 which is a tangential line to the apex of a lower side face 13*b* of the bottom portion 13, and the virtual line V2. In a case where the inclined wall 12 and the bottom portion 13 are connected in a curved shape as in the present embodiment, the inner end part 13*a* of the bottom portion 13 is a virtual portion. On the other hand, in a case where the inclined wall 12 and the bottom portion 13 are connected in a linearly pointed shape, the inner end part 13*a* of the bottom portion 13 is an actual portion.

Each of the two end parts of the flange 11 in the longitudinal direction L is formed in a curved shape in plan view, and smoothly connects with the flange 1 of an adjacent partial unit 10. In the present embodiment, in each stretch-formed portion 9, the flanges 11 of at least some of the partial units 10 are adhered to the joint 7 at the upper face 11*b*, and are adhered to the outer panel 3 through the joint 7. As illustrated in FIG. 5, the inclined wall 12 extends downward from the flange 11.

The inclined wall 12 is disposed between the flange 11 and the bottom portion 13, and connects the flange 11 and the bottom portion 13. The inclined wall 12 is provided over the entire area in the longitudinal direction L of the partial unit 10 in which the inclined wall 12 in question is provided. The inclined wall 12 is formed, for example, in a tapered shape that advances toward the central axis side (the inner end part 11*a* side) of the stretch-formed portion 9 as it approaches the outer panel 3 side.

The flange 11 is continuous with the upper end of the inclined wall 12. The bottom portion 13 is continuous with the lower end of the inclined wall 12. In a cross section orthogonal to the longitudinal direction L of the partial unit 10, the flange 11 and the inclined wall 12 are continuous with each other in a smoothly curving shape, and are connected in a form in which it is difficult for stress concentration to occur. Similarly, the bottom portion 13 and the inclined wall 12 are continuous with each other in a smoothly curving shape, and are connected in a form in which it is difficult for stress concentration to occur.

In the stretch-formed portion 9, the bottom portion 13 is a portion that is farthest from the outer panel 3, and is connected to the top plate 22*b* of the second pedestal 22. The bottom portion 13 is formed in a curved shape which is convex in the downward direction. The bottom portion 13 is provided over the entire area in the longitudinal direction L of the partial unit 10 in which the inclined wall 12 in question is provided. In a cross section orthogonal to the longitudinal direction L of the partial unit 10, the flange 11, the inclined wall 12, and the bottom portion 13 are arranged in that order from the inner side to the outer side in the radial direction of the stretch-formed portion 9. The front end 13*c* of the bottom portion 13 in one stretch-formed portion 9 is integral with the front end 13*c* of the bottom portion 13 in another stretch-formed portion 9 that is adjacent thereto. As clearly illustrated in FIG. 6, in a single stretch-formed portion 9, the bottom portions 13 of the partial units 20 which are adjacent to each other are butted against each other and are directly continuous with each other. For example, in a single stretch-formed portion 9, the bottom portion 13 of the partial unit 10*a* is butted against and directly continuous with the bottom portion 13 of each of the partial units 10*b* and 10*f*. Further, the front ends 13*c* of the six bottom portions 13 of the six partial units 10*a* to 10*f* form an stretch-formed portion boundary 14 having a hexagonal shape as a whole. Further, at the stretch-formed portion boundary 14, the bottom portions 13 of the adjacent stretch-formed portions 9 and 9 are continuous with each other. By this means, the stretch-formed portions 9 and 9 which are adjacent to each other have the partial units 10 in which the bottom portions 13 are continuous with each other. For example, in the stretch-formed portions 9 and 9 which are adjacent to each other, the bottom portion 13 of the partial unit 10*a* of one of the stretch-formed portions 9 and the bottom portion 13 of the partial unit 10*d* of the other stretch-formed portion 9 are butted against each other and are directly continuous with each other.

According to the above configuration, in each of the stretch-formed portions 9, connecting portions between the partial units 10 and 10 that are adjacent to (continuous with) each other form a corner portion 9b of an outer circumferential portion 9a of the stretch-formed portion 9. The corner portion 9b includes, end parts of the partial units 10 and 10, end parts of the flanges 11 and 11, and end parts of the inclined walls 12 and 12 which are adjacent to each other, respectively, in the longitudinal direction L of the partial unit 10. In the present embodiment, six of the corner portions 9b are provided in a single stretch-formed portion 9. The corner portion 9b is formed in a smooth curved shape. In the stretch-formed portion 9, a stretch-formed-side top portion 9c as a portion that juts out from the bottom portion 13 is formed in a bulging shape that is convex outward in the radial direction and upward in the height direction Z of the stretch-formed portion 9.

The shape of the stretch-formed-side top portion 9c of the stretch-formed portion 9 is a hexagon as a polygon. That is, the outer circumferential portion 9a of the stretch-formed portion 9 is a hexagon as a polygon. Further, the shape of an edge portion 18a of the through-hole 18 of the stretch-formed portion 9 is a hexagon as a polygon. Although in the present embodiment the hexagon of the stretch-formed-side top portion 9c and the edge portion 18a of the through-hole 18 are arranged concentrically, they need not be concentric. According to the above configuration, in the present embodiment, the outer circumferential portion 9a of the stretch-formed portion 9 is formed in an M-sided shape (M is an integer of 3 or more; in the present embodiment, M=6). In addition, the edge portion 18a of the through-hole 18 is formed in an N-sided shape (N is an integer of 3 or more; in the present embodiment, N=6). Further, M=N. Note that, the values of the aforementioned M and N may be 4, 5, or 7 or more. Further, M need not be equal to N.

In the present embodiment, the outer circumferential portion 9a of the stretch-formed portion 9 and the edge portion 18a of the through-hole 18 are a similar shape except for the shapes of the corner portions 9b and 18b.

In the present embodiment, the maximum value of a distance D1 between the two flanges 11 and 11 of the two partial units 10 and 10 in which the bottom portions 13 and 13 are arranged separated from each other and which are adjacent to each other is preferably set to 250 mm or less.

The term "separated from each other" means that the portions in question do not directly contact each other. In a case where two bottom portions 13 and 13 are connected via another portion such as another bottom portion 13 or the like, they are said to be separated from each other. For example, in a single stretch-formed portion 9, although the bottom portion 13 of the partial unit 10a and the bottom portion 13 of the partial unit 10b are continuous with each other, since the bottom portion 13 of the partial unit 10a and the bottom portion 13 of the partial unit 10c are continuous through the bottom portion 13 of the partial unit 10b, they are "separated from each other". Further, in stretch-formed portions 9 and 9 which are adjacent, although the partial unit 10a and the partial unit 10d whose bottom portions 13 are directly connected to each other are continuous with each other, because the bottom portion 13 of the partial unit 10a of one of the stretch-formed portions 9 and the bottom portion 13 of the partial unit 10e of the other stretch-formed portion 9 are not directly connected, the partial unit 10a and the partial unit 10e in question are separated from each other.

The term "adjacent" means that the relevant parts are directly adjacent to each other, and in a case where another portion is arranged between two partial units 10 and 10, the two partial units 10 and 10 in question are not said to be adjacent. For example, in a single stretch-formed portion 9, the partial unit 10a faces all of the partial units 10b to 10f without any other member being interposed therebetween, and can be said to be adjacent to the partial units 10b to 10f. Further, in stretch-formed portions 9 and 9 which are adjacent, it can be said that one partial unit 10a of one of the stretch-formed portions 9 and the partial unit 10d which is closest to the one partial unit 10 in question are adjacent. For example, in the case of stretch-formed portions 9 and 9 which are adjacent, because the partial unit 10d of another stretch-formed portion 9 is present between the partial unit 10a of one of the stretch-formed portions 9 and the partial unit 10a of the other of the stretch-formed portions 9, the partial unit 10a of the one of the stretch-formed portions 9 and the partial unit 10a of the other of the stretch-formed portions 9 are not said to be adjacent.

In a single stretch-formed portion 9, the maximum value of the distance D1 between the flanges 11 and 11 of two of the partial units 10 and 10 on opposite sides is preferably 250 mm or less. More specifically, the distance between the flanges 11 and 11 of the partial units 10a and 10d, the distance between the flanges 11 and 11 of the partial units 10b and 10e, and the distance D1 between the partial units 10c and 10f are each preferably 250 mm or less.

Further, in two stretch-formed portions 9 and 9 which are adjacent, a frame portion 15 having a hat-shaped cross section is formed by a pair of the partial units 10 and 10 that include a pair of the bottom portions 13 and 13 which are butted against each other and are directly continuous with each other. In the drawing, the frame portion 15 is surrounded by an oval dashed line. The frame portion 15 has, for example, the partial unit 10a of one stretch-formed portion 9 and the partial unit 10d of another stretch-formed portion 9. A plurality of the frame portions 15 are formed, and each frame portion 15 is formed by two different stretch-formed portions 9 and 9. In the present embodiment, the frame portion 15 is formed by a pair of the partial units 10 and 10 which are parallel to each other. The inner panel 2 has a configuration in which a plurality of the frame portions 15 are combined, with each frame portion 15 used as a single unit structure. Further, in the present embodiment, an intersection portion 16 is formed by a plurality of the frame portions 15 intersecting with each other. At the intersection portion 16, one of the frame portions 15, another of the frame portions 15, and a further other of the frame portions 15 intersect with each other. In the present embodiment, by disposing the polygonal stretch-formed portions 9 in a close-packed arrangement, a plurality of the intersection portions 16 of a plurality of the frame portions 15 are provided, and the shapes of the respective intersection portions 16 are substantially the same. In this case, the term "substantially" means exhibiting the same properties with respect to panel rigidity and dent resistance. In the present embodiment, the longitudinal directions of the plurality of frame portions 15 are different from each other, and therefore the strength against a load from any direction that acts on the inner panel 2 on a plane orthogonal to the height direction Z is secured.

In the present embodiment, a distance D2 between the flanges 11 and 11 between two frame portions 15 and 15 which are arranged separated from each other and are adjacent is defined. The distance D2 is the distance between the flanges 11 and 11 at two of the frame portions 15 and 15 which, in plan view, are arranged separated from each other and are adjacent, and which are two of the frame portions 15 and 15 that face each other in a direction orthogonal to the longitudinal direction L of the flanges 11 and 11. In the present embodiment, the maximum value of the distance D2 is preferably 250 mm or less. Thus, the maximum value of the distance D2 between the flanges 11 and 11 of two of the frame portions 15 and 15 arranged as opposite sides to each other is preferably 250 mm or less.

By the maximum value of at least one of the distances D1 and D2 being 250 mm or less, the support span of the outer panel 3 that is supported by the inner panel 2 can be prevented from becoming too long, and as a result the panel rigidity of the outer panel 3 that is sufficient for practical use can be secured while making the inner panel 2 light in weight.

The minimum value of at least one of the distances D1 and D2 is preferably 30 mm or more. By the minimum value of the distances D1 and D2 being 30 mm or more, flexural deformation of the outer panel 3 can be moderately tolerated, and as a result the dent resistance of the outer panel 3 that is supported by the inner panel 2 that is sufficient for practical use can be secured.

In the present embodiment, the height of the partial unit 10 in the height direction Z, that is, a height H1 of the stretch-formed portion 9, is the distance between the inner end part 13*a* of the bottom portion 13 and the outer end part 11*c* of the flange 11 in the height direction Z, in other words, the height from the bottom portion 13 to the flange 11. The height H1 is preferably 10 mm or more. By setting the height H1 to 10 mm or more, when an external force that tends to bend the inner panel 2, that is, an external force that deflects a part or all of the inner panel 2 in a bow shape acts, a second moment of area with respect to a bending moment produced by the external force can be made higher. By this means, bending deformation of the inner panel 2 and the outer panel 3 that is joined to the inner panel 2 can be suppressed. The height H1 is preferably 13 mm or more.

Note that, as described above, the height H1 of the stretch-formed portion 9 is preferably 10 mm or more. On the other hand, as illustrated in FIG. 1 and FIG. 2, in the present embodiment, at least at one part of an outermost circumferential partial unit 101 as the partial unit 10 in the stretch-formed portion 9 that is adjacently arranged so as to be closest to the outer circumferential edge portion of the outer circumferential portion 4 of the inner panel 2, the height from the bottom portion 13 to the flange 11 is lower than the height H1 in the other partial units 10. By making the height at the outermost circumferential partial unit 101 lower than the height H1 in the other partial units 10 in this manner, a shape change at a boundary portion between the outermost circumferential partial unit 101 and the outer circumferential portion 4 of the inner panel 2 can be made smooth. As a result, the stress concentration during forming at the boundary portion in question can be suppressed, and unintended cracking of the inner panel 2 at the boundary portion can be more surely suppressed. The difference between the height H1 of the partial units 10 and the height of the outermost circumferential partial unit 101 is appropriately set according to the shape of the outer circumferential portion 4 of the inner panel 2.

Next, the joint 7 will be more specifically described. In the present embodiment, the joint 7 is an adhesive. A mastic sealer (mastic adhesive) can be exemplified as the adhesive. A resin-based adhesive can be exemplified as the mastic sealer. The adhesive may have a property of being cured at normal temperature (for example, 20 degrees Celsius), or may have a property of being cured by undergoing a heating process or a drying process. In each stretch-formed portion 9, the joint 7 is provided in at least some of the plurality of flanges 11 and 11. Further, the joint 7 joins the flange 11 and an undersurface 3*b* of the outer panel 3 to each other.

<Method for Manufacturing Inner Panel>

Next, one example of the method for manufacturing the inner panel 2 is described.

The process for manufacturing the inner panel 2 includes:
(i) forming a manufacturing intermediate 31 of the inner panel 2 which is a manufacturing intermediate 31 including a planned outer circumferential portion 37 and a planned outline portion 38 by draw forming (including stretch-forming in which there is no inflow from an outer circumferential portion) a blank sheet 30;
(ii) forming a manufacturing intermediate 32 including the through-hole 18 by performing piercing work on the manufacturing intermediate 31;
(iii) forming a manufacturing intermediate 33 including the stretch-formed portions 9 by forming the manufacturing intermediate 32; and
(iv) performing finishing work such as a restriking process or a trimming process on the manufacturing intermediate 33, to thereby complete the inner panel 2.

Note that, the finishing work of (iv) above is not essential and need not be performed. In such a case, the manufacturing intermediate 33 serves as the inner panel 2. Further, as a process of (v), between the above process of (i) and process of (ii), an intermediate stretch-formed portion 39 may be formed as an intermediate forming portion of the stretch-formed portion 9. In such a case, the processes from the above (ii) onward are performed on a manufacturing intermediate 35 including the intermediate stretch-formed portion 39. Hereinafter, the above processes (i) to (v) are more specifically described.

<Process of (i) Above (Forming of Planned Outline Portion 38)>

Figure 8:
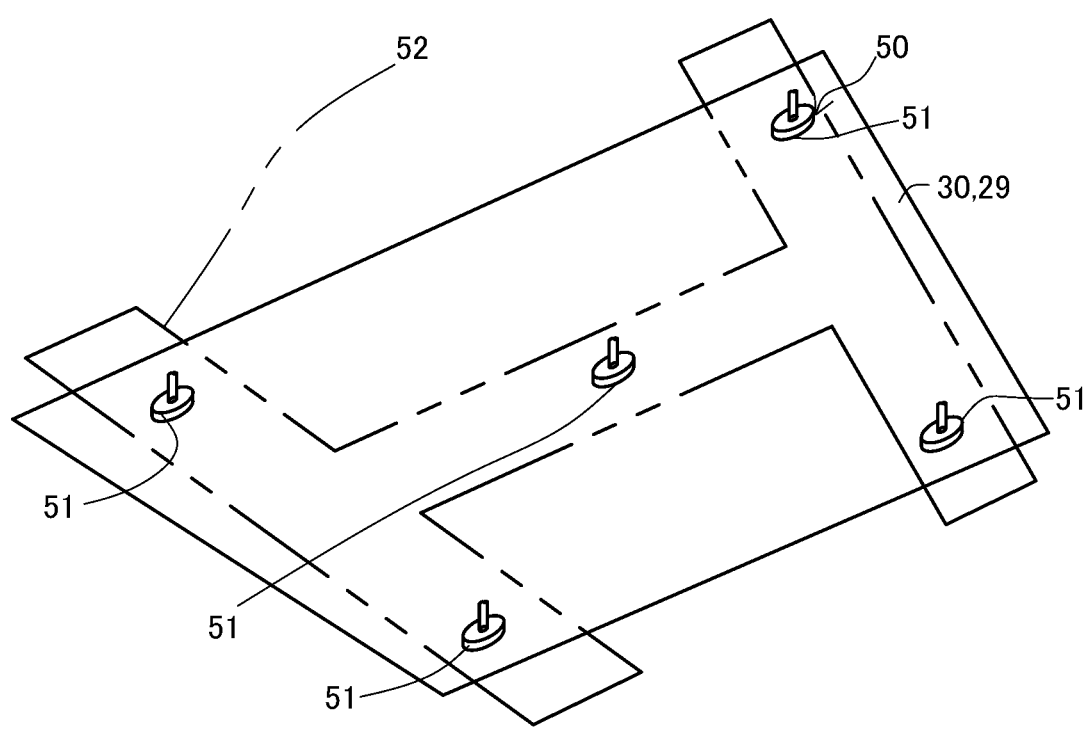
FIG. 8 is a schematic perspective view illustrating a principal part of a vacuum carrier machine and a blank sheet.

Referring to FIG. 8, when manufacturing the inner panel 2, the blank sheet 30 as a flat sheet member formed in a predetermined shape is prepared. FIG. 8 is a schematic perspective view of a principal part of a vacuum carrier machine 50 and the blank sheet 30. Note that, hereunder, in some cases the blank sheet 30 and the manufacturing intermediates 31 to 33, and 35 and 36 that are described later may be collectively referred to as a "starting material 29". The sheet thickness of the blank sheet 30 is the same as the sheet thickness of the inner panel 2, and preferably is 0.5 mm or less. In the present embodiment, the shape of the outer circumferential portion of the blank sheet 30 is formed in a trapezoidal shape as a shape that is close to the shape of the inner panel 2.

The vacuum carrier machine 50 is provided for transferring the starting material 29 to a press forming machine or from a press forming machine while maintaining a substantially horizontal posture. The vacuum carrier machine 50 has a plurality of vacuum cups 51, and a carrier mechanism 52 for carrying the vacuum cups 51. Each vacuum cup 51 is formed in a cup shape having a diameter of several cm to 150 cm, and has a suction port. Each vacuum cup 51 is connected to an actuation air source (not illustrated), and sucks and holds an object such as the manufacturing intermediate 31 by a suction operation.

The carrier mechanism 52 has a drive mechanism such as a robot arm, and each vacuum cup 51 is supported by the carrier mechanism 52. Note that, in FIG. 8, the carrier mechanism 52 is conceptually illustrated in a simple fashion, and is shown by a chain double-dashed line that is a virtual line. The carrier mechanism 52 transfers the starting material 29 between a plurality of press forming machines together with the respective vacuum cups 51. In the present embodiment, the operation of sucking the starting material 29 can be turned on and off at the respective vacuum cups 51 independently of each other. By this means, the vacuum carrier machine 50 can suck and carry the optimum places according to the state of the starting material 29. Further, it is also possible to remove some vacuum cups 51, and a portion of the carrier mechanism 52 which supports the aforementioned some vacuum cups 51 from the vacuum carrier machine 50. Further, at a time of press working of the starting material 29 by a press forming machine, after the vacuum carrier machine 50 releases the hold of the starting material 29 in a manner so as not to come in contact with the die, the vacuum carrier machine 50 is moved to a position where the vacuum carrier machine 50 stands by away from the press forming machine.

Note that, although in the present embodiment a configuration in which the starting material 29 is held by means of a vacuum (suction) and transferred is described as an example, a different configuration may also be adopted. The starting material 29, for example, may be transferred by being gripped or supported from underneath by a robot arm, or may be transferred by being attached to an electromagnetic mechanism such as an electromagnet.

In the present embodiment, the vacuum cups 51 are attached to the vicinity of the four corners and to the center of the blank sheet 30. Then, by suction of the respective vacuum cups 51 and operation of the carrier mechanism 52, the blank sheet 30 is transferred to a press forming machine 41 illustrated in FIG. 9(A) and FIG. 9(B) while maintaining a substantially horizontal posture.

FIG. 9(A) is a schematic cross-sectional view illustrating the blank sheet 30 and the principal part of the press forming machine 41 in the process of (i). FIG. 9(B) is a schematic cross-sectional view of the principal part that illustrates press working in the process of (i) by the press forming machine 41. The blank sheet 30 that is transferred to the press forming machine 41 by the vacuum carrier machine 50 is subjected to draw forming using the press forming machine 41. The press forming machine 41 is used for forming the planned outer circumferential portion 37 as a planned portion for the outer circumferential portion 4 that includes the outline portion 5 of the inner panel 2. The planned outer circumferential portion 37 includes the planned outline portion 38 that will become the outline portion 5.

The press forming machine 41 has a punch 41a, a die 41b, and a blank holder 41c which cooperates with the die 41b to hold down the outer circumferential portion of the blank sheet 30. In the draw forming using the press forming machine 41, the blank sheet 30 is subjected to forming work while a part of the blank sheet 30 is restrained by the die 41b and the blank holder 41c, to thereby form the blank sheet 30 into the manufacturing intermediate 31 of the inner panel 2. FIG. 10(A) is a perspective view of the manufacturing intermediate 31 after the process of (i). Referring to FIG. 10(A), the manufacturing intermediate 31 includes the planned outer circumferential portion 37 which is a planned portion for the outer circumferential portion 4 including the outline portion 5. The planned outer circumferential portion 37 includes the planned outline portion 38 as the planned portion for the outline portion 5. That is, in the process of (i), the planned outline portion 38 is formed from the blank sheet 30 as a starting material, and the blank sheet 30 becomes the manufacturing intermediate 31. That is, the planned outline portion 38 including an undulating shape is formed in the flat-sheet shaped blank sheet 30 to thereby form the manufacturing intermediate 31. The planned outer circumferential portion 37 becomes the outer circumferential portion 4 when the shape of the planned outer circumferential portion 37 is finely adjusted by performing a restriking process that is described later. In this case the phrase "finely adjusted" refers to an adjustment such that, for example, when the amount of positional change at each part of the planned outer circumferential portion 37 when the planned outer circumferential portion 37 is formed from the blank sheet 30 is taken as 100%, the amount of positional change when the outer circumferential portion 4 is formed from the planned outer circumferential portion 37 is about several percent. Therefore, the shape of the planned outer circumferential portion 37 is approximately the same as the shape of the outer circumferential portion 4.

In the manufacturing intermediate 31, a flat portion 40 is formed by the flat shape of the blank sheet 30 (starting material) being maintained in a region from the planned outline portion 38 toward the center of the blank sheet 30 (a position closer to the center of the manufacturing intermediate 31 relative to the planned outline portion 38). Note that, during working by the press forming machine 41, the flat portion 40 may be subjected to working so as to be curved slightly in conformity with the moderately curved shape of the outer panel 3. A place that has been subjected to such curving working is also referred to as a "flat portion" or a "flat shape" in the present description. The curved shape in the flat portion 40 is formed in the entire flat portion 40, regardless of the places where the stretch-formed portions 9 are formed. When the flat portion 40 is subjected to working so as to have a curved shape, the radius of curvature of the flat portion 40 is approximately the same as the radius of curvature of the outer panel 3 at a place where the outer panel 3 faces the stretch-formed portions 9, and for example is 500 mm or more. The planned outline portion 38 has a planned flat outline portion 60 as a planned portion for the flat outline portion 20, a planned first pedestal portion 61 as a planned portion for the first pedestal 21, and a planned second pedestal portion 62 as a planned portion for the second pedestal 22. The planned flat outline portion 60, the planned first pedestal portion 61 and the planned second pedestal portion 62 will become the flat outline portion 20, the first pedestal 21 and the second pedestal 22, respectively, of the inner panel 2 when subjected to a restriking process.

FIG. 10(B) is a schematic perspective view illustrating a state in which the vacuum carrier machine 50 is attached to the manufacturing intermediate 31 after the process of (i), in which illustration of a part of the vacuum carrier machine 50 is omitted. As illustrated in FIG. 10(B), in the planned outer circumferential portion 37 of the manufacturing intermediate 31, each vacuum cup 51 is attached to the planned flat outline portion 60 that is a flat portion. The vacuum cups 51 are attached, for example, to about five or six places on the planned outer circumferential portion 37 at intervals of an appropriate distance. In FIG. 10(B), as one example, the vacuum cups 51 are attached to the planned flat outline portions 604, 605, 606, and 607 as planned portions for the flat outline portions 204, 205, 206 and 207. Then, by the suction of the vacuum cups 51 and operation of the carrier mechanism 52 (not illustrated in FIG. 10(B)), the manufacturing intermediate 31 is carried between press forming machines while maintaining a substantially horizontal posture. More specifically, after the planned outline portion 38 is formed from the blank sheet 30, by carrying the manufacturing intermediate 31 while supporting the planned flat outline portion 60 using the vacuum carrier machine 50, the manufacturing intermediate 31 is carried from the press forming machine 41 for forming the planned outline portion 38 to a different press forming machine 42 that is to be used in a downstream process after the planned outline portion 38 has been formed.

<Process of (ii) Above (Formation of Through-Hole 18)>

FIG. 11(A) is a schematic cross-sectional view illustrating the manufacturing intermediate 31 and the principal part of the press forming machine 42 in the process of (ii). FIG. 11(B) is a schematic cross-sectional view of the principal part illustrating piercing work by the press forming machine 42 in the process of (ii). Referring to FIG. 11(A) and FIG. 11(B), as mentioned above, the manufacturing intermediate 31 is carried in a horizontal posture by the vacuum carrier machine 50 from the press forming machine 41 to another press forming machine 42. Then, at the press forming machine 42, a punch is used to pierce a plurality of the through-holes 18 in the manufacturing intermediate 31. Note that, as illustrated in FIG. 11(A) and FIG. 11(B), in the press forming machine 42, an upper cutting die 42a and a peripheral portion 42b of the upper cutting die 42a may be integrated, or, although not illustrated in the drawing, the upper cutting die 42a and the peripheral portion 42b may be separate bodies. In a case where the upper cutting die 42a and the peripheral portion 42b are separate bodies, the upper cutting die 42a may pierce the manufacturing intermediate 31 by performing a pressing operation to a lower cutting die 42c side in a state in which the peripheral portion 42b holds down the flat portion 40. In the manufacturing intermediate 31, the through-holes 18 are formed in the flat portion 40 that is closer to the center of the manufacturing intermediate 31 (starting material) relative to the planned outline portion 38. The through-holes 18 are formed at each of the planned places for forming the plurality of stretch-formed portion 9. There may be cases where the through-hole 18 need not necessarily be provided in all of the stretch-formed portions 9. By forming a plurality of the through-holes 18 in the manufacturing intermediate 31, as illustrated in FIG. 11(C), the manufacturing intermediate 31 becomes the manufacturing intermediate 32 after undergoing the process of (ii). In the manufacturing intermediate 32, a plurality of the through-holes 18 are formed in the flat portion 40. Note that, although not illustrated in FIG. 11(C), through-holes for the incomplete stretch-formed portions 8 and through-holes for the reinforcing stretch-formed portions 23 are also similarly formed. In this embodiment, since portions (intermediate stretch-formed portions) that will become the stretch-formed portions 9 are not formed before the process of (iii), an intermediate forming height as the forming height of the intermediate stretch-formed portions is zero.

<Process of (iii) Above (Forming of Stretch-Formed Portions 9)>

FIG. 12(A) is a schematic cross-sectional view illustrating the manufacturing intermediate 32 and a principal part of a press forming machine 43 in the process of (iii). FIG. 12(B) is a schematic cross-sectional view of the principal part that illustrates processing of the stretch-formed portion 9 by the press forming machine 43 in the process of (iii). Referring to FIG. 12(A) and FIG. 12(B), by the planned flat outline portion 60 being sucked by the vacuum carrier machine 50, the manufacturing intermediate 32 is carried in a horizontal posture from the press forming machine 42 to the different press forming machine 43. The stretch-formed portions 9 are then formed by using the press forming machine 43 to perform processing on the manufacturing intermediate 32. Note that, since the processes for forming the incomplete stretch-formed portions 8 and the reinforcing stretch-formed portions 23 are similar to the process for forming the stretch-formed portions 9, a description is omitted here.

The press forming machine 43 has a plurality of hexagonal punches 43a (in FIG. 12(A) and FIG. 12(B), one punch 43a among the plurality of punches 43a is illustrated), and a die 43b. In the forming using the press forming machine 43, the outer circumferential portion of a region in which the plurality of stretch-formed portions 9 are to be provided is held down with a pad (not illustrated) of an upper die or the like, and the periphery of each stretch-formed portion 9 is then processed by bend-forming without being restrained in the course of the forming. The manufacturing intermediate 32 is processed in this way to become the manufacturing intermediate 33. In the manufacturing intermediate 33, the flat portion 40 after forming the through-hole 18 therein is formed to a height that is the same as the height H1 of the stretch-formed portion 9, to thereby form the stretch-formed portion 9. Note that, the stretch-formed portion 9 is not completely formed at the press forming machine 43, and the stretch-formed portion 9 may be completed by performing a restriking process, described later, to finely adjust the shape of the portion that will be the stretch-formed portion 9.

<Process of (iv) Above (Finishing Work)>

FIG. 13(A) is a schematic cross-sectional view illustrating the manufacturing intermediate 33 and a principal part of a press forming machine 44 in the process of (iv). FIG. 13(B) is a schematic cross-sectional view of the principal part that illustrates a restriking process performed by the press forming machine 44 in the process of (iv). Referring to FIG. 13(A) and FIG. 13(B), the manufacturing intermediate 33 is carried in a horizontal posture from the press forming machine 43 to the different press forming machine 44 while the planned flat outline portion 60 is being sucked by the vacuum carrier machine 50. The manufacturing intermediate 33 is then subjected to a restriking process using the press forming machine 44. The press forming machine 44 performs the restriking process as finishing work on the planned outline portion 38 of the manufacturing intermediate 33.

At this time, the amount of plastic deformation of each part of the planned outline portions 38 caused by the press forming machine 44 is less than the amount of plastic deformation of each corresponding part of the blank sheet 30 caused by the press forming machine 41 when forming the planned outline portion 38 from the blank sheet 30. Further, the shape of the planned outline portion 38 is finely adjusted by the restriking process. In addition, by adjusting the shape of the outer circumferential portion of the manufacturing intermediate 33 by a trimming process that is not illustrated in the drawings, the planned outline portion 38 becomes the outline portion 5, and the planned outer circumferential portion 37 becomes the outer circumferential portion 4. That is, by performing a restriking process and a trimming process as finishing work on the manufacturing intermediate 33, the manufacturing intermediate 33 becomes the inner panel 2. Note that, a process other than a restriking process and a trimming process may be performed as the finishing work. Further, this restriking and trimming process may be performed simultaneously with any of the processes in the above (i), (ii) and (iii). Further, the restriking process and the trimming process may be performed in separate processes to each other.

<Process of (v) Between the Above Processes of (i) and (ii) (Forming of Intermediate Stretch-Formed Portion 39)>

FIG. 14(A) is a schematic cross-sectional view illustrating the manufacturing intermediate 31 and a principal part of a press forming machine 45 in the process of (v). FIG. 14(B) is a schematic cross-sectional view of the principal part that illustrates forming by the press forming machine 45 in the process of (v). Referring to FIG. 14(A) and FIG. 14(B), in the case of forming intermediate stretch-formed portions 35 before forming the through-holes 18 by piercing work in the manufacturing intermediate 31, the manufacturing intermediate 31 is transferred from the press forming machine 41 to the different press forming machine 45 while being kept in a substantially horizontal posture by the suction of the vacuum cups 51 and the operation of the carrier mechanism.

The press forming machine 45 has a plurality of hexagonal punch protruding portions 45a (in FIG. 14(A) and FIG. 14(B), one punch protruding portion 45a among the plurality of punch protruding portions 45a is illustrated), and a die 45b. In the forming using the press forming machine 45, the outer circumferential portion of a region in which the plurality of stretch-formed portions 9 are to be provided is held down with a pad (not illustrated) of an upper die or the like, and the periphery of each stretch-formed portion 9 is then processed by being sandwiched between the punch protruding portion 45a and the die 45b without being restrained in the course of the forming. In this way, the manufacturing intermediate 31 is formed and becomes the manufacturing intermediate 35. With respect to the manufacturing intermediate 35, the intermediate stretch-formed portion 39 having a predetermined intermediate forming height H2 in the thickness direction (corresponds to the height direction Z) of the manufacturing intermediate 31 is formed in the flat portion 40 prior to formation of the through-holes 18, that is, in a region from the planned outline portion 38 toward the center of the manufacturing intermediate 31 (starting material). In the present embodiment, the intermediate stretch-formed portion 39 is formed in a convex shape having a hexagonal external shape. The intermediate forming height H2 in this case is preferably less than one half of the height H1 of the stretch-formed portion 9. Note that, the processing for forming the manufacturing intermediate 35 from the manufacturing intermediate 31 may be performed at the press forming machine 41. That is, the blank sheet 30 may be made into the manufacturing intermediate 35 at the press forming machine 41 by forming the intermediate stretch-formed portion 39 at the same time as forming the manufacturing intermediate 31 from the blank sheet 30.

Figure 15:
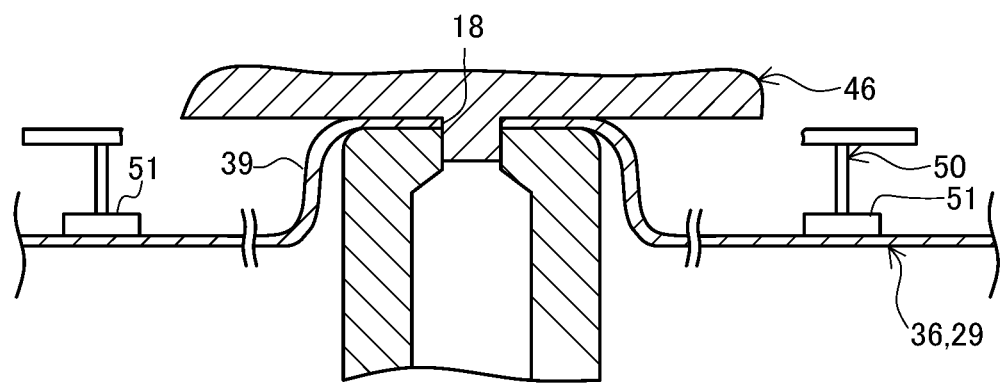
FIG. 15 is a view illustrating a principal part in a modification of the process of (ii).

As illustrated in FIG. 15 that illustrates the principal part of a modification of the above process of (ii), the manufacturing intermediate 35 is transferred to a press forming machine 46 by the vacuum carrier machine 50 in a similar manner to the manner in the above-described process of (ii). The manufacturing intermediate 35 is then subjected to piercing work by the press forming machine 46 (the press forming machine 46 that is different from the press forming machine 45) which is capable of performing piercing work. That is, by piercing the stretch-formed-side top portions of the intermediate stretch-formed portions 39 to form the through-holes 18, the manufacturing intermediate 35 becomes a manufacturing intermediate 36. By subjecting the manufacturing intermediate 36 to similar forming as the forming performed on the manufacturing intermediate 32, by means of the press forming machine 43 (see FIG. 12(A) and FIG. 12(B)) described in the process of (iii), the manufacturing intermediate 36 becomes the manufacturing intermediate 33. That is, the intermediate stretch-formed portion 39 after the through-hole 18 has been formed is formed into the stretch-formed portion 9 having the height H1 that is greater than the intermediate forming height H2. The processing from the time that the manufacturing intermediate 36 becomes the manufacturing intermediate 33 onward is the same as described in the foregoing.

As described above, according to the present embodiment, when manufacturing the inner panel 2 that is a press-formed product, after the planned outline portion 38 is formed, the through-holes 18 are formed by piercing work, and thereafter the stretch-formed portions 9 are formed by subjecting the flat portion 40 or the intermediate stretch-formed portion 39 to hole expansion forming. According to this configuration, the occurrence of cracks in the starting material 29 (the manufacturing intermediates 31 to 33, 35, 36 and the like) during press forming for manufacturing the inner panel 2 can be suppressed, and the occurrence of an unintended deformation or misalignment when transferring the starting material 29 during press forming can also be suppressed. More specifically, in the press forming, the thin sheet 29 is transferred between a plurality of press forming machines in sequence by the vacuum carrier machine 50, to thereby form the inner panel 2 from the blank sheet 30. When this transferring is performed, at the time point at which the manufacturing intermediate 31 is formed from the blank sheet 30, the planned outline portion 38 that has an undulating shape is formed in the outer circumferential portion of the manufacturing intermediate 31. Hence, in the manufacturing intermediates from the manufacturing intermediate 31 onward, the bending rigidity is enhanced, and it is thus made difficult for an unintended deformation such as a bending deformation to occur during transfer by the vacuum carrier machine 50. Therefore, since the occurrence of a situation in which the outer circumferential portion or central portion of the manufacturing intermediate 31 deflects downward due to its own weight can be suppressed, the occurrence of an unintended plastic deformation in the starting material 29 of the inner panel 2 can be more surely suppressed. In addition, when the starting material 29 is being transferred while being sucked by the vacuum carrier machine 50, since the occurrence of a deflection of the starting material 29 is suppressed, a reduction in the suction force that is caused by a gap being formed between the starting material 29 and a suction port due to a deflection of the starting material 29 can be suppressed. Hence, relative misalignments between the starting material 29 and the press forming machines 41 to 46 that are caused by a misalignment of the starting material 29 with respect to a suction port can be suppressed. As a result, a decrease in the dimensional accuracy of the inner panel 2 can be suppressed. In addition, because final forming of the stretch-formed portion 9 is performed after piercing, the occurrence of a crack in the vicinity of the stretch-formed-side top portion 9c of the stretch-formed portion 9 can be suppressed.

The reason the aforementioned crack suppression can be realized will now be described more specifically. FIG. 16(A) is a schematic perspective view illustrating an stretch-formed portion 9' when the stretch-formed portion 9' has been formed from a blank without forming a through-hole. FIG. 16(B) is a graph showing the relation between the position on a line O-O' and the maximum principal strain el with respect to the stretch-formed portion 9' illustrated in FIG. 16(A). FIG. 17(A) is a schematic perspective view illustrating the stretch-formed portion 9 when the stretch-formed portion 9 has been formed after forming the through-hole 18 in the blank. FIG. 17(B) is a graph showing the relation between the position on a line O-O' and the maximum principal strain el with respect to the stretch-formed portion 9 illustrated in FIG. 17(A).

As illustrated in FIG. 16(A) and FIG. 16(B), when the stretch-formed portion 9' is formed by forming a blank, the blank is drawn by a large amount by the punch and the die. Therefore, a crack does not occur in the vicinity of an stretch-formed-side top portion 9c' that is strongly sandwiched between the punch and the die and is in frictional contact with the punch and the die. However, at a place 9d' that is slightly below the stretch-formed-side top portion 9c', the frictional force from the punch and the die weakens, and consequently strain concentrates at the place 9d', and the maximum principal strain si at the place 9d' is more than an allowance ε1a, and a crack occurs at the place 9d'. It is considered that one cause of this phenomenon is that although on one hand the top portion of the stretch-formed portion 9d' is filled with the starting material and there is a little plastic deformation of the starting material at the top portion of the stretch-formed portion 9', on the other hand the amount of plastic deformation of the starting material increases at the place 9d'.

In contrast, as illustrated in FIG. 17(A) and FIG. 17(B), when the stretch-formed portion 9 is formed by forming the manufacturing intermediate 32 after the through-hole 18 has been formed, a crack does not occur even when the manufacturing intermediate 32 is drawn by a large amount by the punch 43a and the die 43b. The presence of the through-hole 18 can be mentioned as one factor that allows the forming to be completed without a crack. When the manufacturing intermediate 32 is strongly sandwiched by the punch 43a and the die 43b and plastically deforms, because the through-hole 18 is present, when a place 9d that is slightly below the stretch-formed-side top portion 9c deforms, the peripheral edge portion of the through-hole 18 can also deform together therewith. Therefore, strain does not concentrate at the place 9d that is slightly below the stretch-formed-side top portion 9c, and the maximum principal strain ε1 at the stretch-formed portion 9 is not more than the allowance ε1a. Hence, a crack does not occur at the place 9d.

Further, according to the present embodiment, the blank sheet 30 is a sheet member that has a thickness of 0.5 mm or less. According to this configuration, since the sheet thickness of the outer panel 3 can be made thin, the automobile panel 1 can be lightened. Further, when the starting material 29 has a thin thickness of about 0.5 mm, at a time that the starting material 29 is transferred by the vacuum carrier machine 50, it is extremely easy for a deflection to occur, and the starting material 29 is liable to undergo an unintended deformation due to an external force received when the starting material 29 is being transferred. Whilst the fact that the starting material 29 is liable to deform when being transferred in this way is a problem peculiar to the present application, the planned outline portion 38 having high bending rigidity which is formed in an undulating shape is formed in the starting material 29 at the initial stage of press forming. Therefore, it is difficult for the starting material 29 to be deflected, and the occurrence of problems during transfer due to the sheet thickness of the starting material 29 being thin can be more surely suppressed.

Note that, in the present embodiment, the process of subjecting the flat portion 40 to stretch-forming to form the stretch-formed portions 9, and the process of piercing to form the through-holes 18 are performed separately to each other. By performing these processes separately, the finished quality of the through-holes 18 in the piercing process can be improved. In other words, in a case where the process of forming the stretch-formed portions 9 and the piercing process to form the through-holes 18 are performed together, the finished quality of the through-holes 18 tends to decrease.

FIG. 18(A) is an enlarged view of a press forming machine 100. FIG. 18(B) is a schematic cross-sectional view for describing the finished quality of a through-hole. As illustrated in FIG. 18(A), in the press forming machine 100, an upper cutting die 100a punches out a starting material 105 placed on a lower cutting die 100b to form a through-hole. To ensure that the upper cutting die 100a does not come in contact with the lower cutting die 100b, usually an inner diameter D12 of the lower cutting die 100b is 3 to 40% larger than a sheet thickness t11 of the starting material 105 in comparison to an outer diameter D11 of the upper cutting die 100a. That is, a clearance CL that is 0.03 to 0.4 times the sheet thickness t11 of the starting material 105 is present between the upper cutting die 100a and the lower cutting die 100b. Under such a premise, if forming of the stretch-formed portion 9 and forming of the through-hole are performed together in a single press operation, an unwanted shape such as a burr 105b that protrudes inward in the horizontal direction is produced on the internal surface of a through-hole 105a. FIG. 18(A) illustrates the burr 105b at the moment when the starting material 105 is punched out by the upper cutting die 100a, and the front end of the burr 105b is facing downward. After punching out the starting material 105, the upper cutting die 100a illustrated in FIG. 18(A) advances further, albeit by a slight amount, to the lower side that is the lower cutting die 100b side to reach bottom dead center, and thereafter rises to top dead center. In FIG. 18(B), the burr 105b at the time of completion of piercing after formation of the through-hole 105a is completed and the upper cutting die 100a has been pulled out from the starting material 105 is shown by a solid line. Note that, in FIG. 18(B), the burr 105b at the moment illustrated in FIG. 18(A) is also shown by a chain double-dashed line. In conventional piercing, the front end of the burr 105b is directed downward in most cases. However, the reason the front end of the burr 105b protrudes inward in the horizontal direction as illustrated in FIG. 18(B) is that, because the stretch-formed portion 9 of the starting material 105 is in the course of being formed, the starting material 105 is punched out while moving, and also that after the starting material 105 has been punched out, because the starting material 105 on which the burr 105b remains moves outward (outward in the radial direction of the through-hole 105a), the starting material 105 comes in contact with the lower cutting die 100b and is bent inward in the horizontal direction.

In particular, in the present embodiment, the sheet thickness of the blank sheet 30 is 0.5 mm or less, which is extremely thin. When the sheet thickness of the blank sheet 30 in which the through-holes 18 are formed is 0.5 mm or less in this way, the absolute value (actual length) of the clearance CL becomes extremely small. Therefore, the adjustment margin of the clearance CL for keeping burrs small tends to be small. Further, it is considered that burrs are liable to occur due to the fact that the starting material 105 is punched out while moving. On the other hand, in the present embodiment, as mentioned above, the process of forming the stretch-formed portions 9 by subjecting the flat portion 40 to stretch-forming, and the piercing process for forming the through-holes 18 are separate to each other. Hence, since the starting material 105 is not moving while the adjustment margin of the clearance CL for keeping burrs small is small, it is easy to suppress the occurrence of an unwanted shape such as the aforementioned burr 105b in the through-holes 18.

Further, according to the present embodiment, after the planned outline portion 38 is formed from the blank sheet 30, by carrying the manufacturing intermediate 31 while supporting the planned flat outline portion 60 of the planned outline portion 38 using the vacuum carrier machine 50, the manufacturing intermediate 31 can be carried from the press forming machine 41 used in the process of (i) to a different press forming machine that is to be used in a downstream process. In the present embodiment, the starting material 29 is transferred between press forming machines for each process. Even in the case of a manufacturing method such as this in which carrying of the starting material is performed a large number of times, it is possible to more surely suppress occurrence of a situation in which the starting material 29 is inadvertently deflected and plastically deforms during forming of the inner panel 2.

Further, according to the present embodiment, after the planned outline portion 38 is formed from the blank sheet 30, the planned outline portion 38 is made into the outline portion 5 by performing finishing work including a restriking process on the planned outline portion 38. According to this configuration, whilst the planned outline portion 38 for securing the bending rigidity is formed at the initial stage of forming the inner panel 2, the outline portion 5 having high dimensional accuracy can be formed at a later stage of forming the inner panel 2.

Further, according to the present embodiment, the shape of the outer circumferential portion 9a of the stretch-formed portion 9 is a polygon. According to this configuration, in each of the stretch-formed portions 9, the strength against a load from any direction can be made higher.

Further, according to the present embodiment, in a case where the intermediate stretch-formed portion 39 is formed, the intermediate forming height H2 of the intermediate stretch-formed portion 39 is preferably less than one half of the height H1 of the stretch-formed portion 9. According to this configuration, the allowance of the height H1 of the stretch-formed portion 9 can be made higher. Further, even in a case where the height H1 of the stretch-formed portion 9 is comparatively low, the occurrence of a crack in the intermediate stretch-formed portion 39 or the stretch-formed portion 9 can be more surely suppressed. The reason the intermediate forming height H2 is preferably made less than one half of the height H1 of the stretch-formed portion 9 will now be described more specifically.

Figure 19:
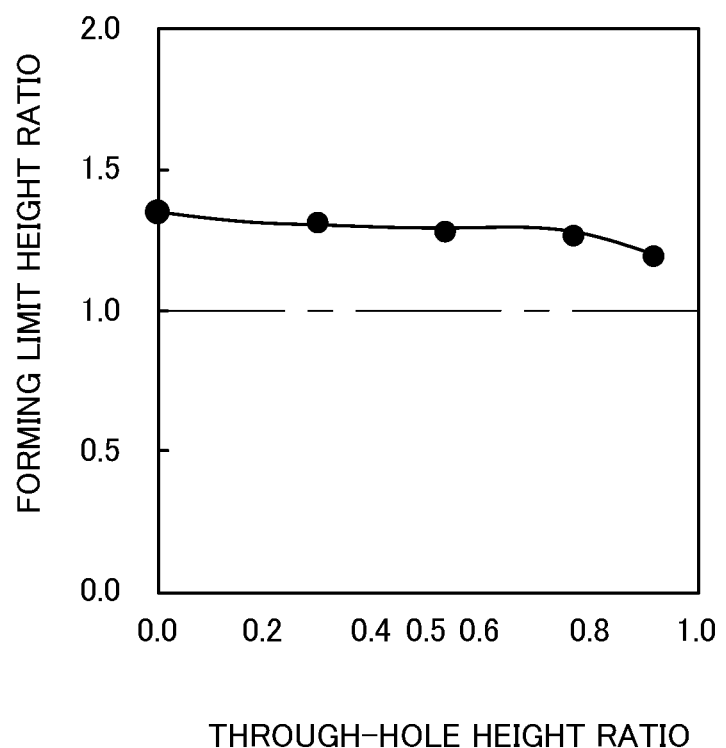
FIG. 19 is a diagram illustrating the relation between a height of an intermediate stretch-formed portion when the through-hole is formed by piercing, and a limit value (allowance) of a height that can be formed as the stretch-formed portion.

FIG. 19 is a diagram illustrating the relation between the height H2 of the intermediate stretch-formed portion 39 when the through-hole 18 is formed by piercing, and a limit value (allowance) of the height H1 that can be formed as the stretch-formed portion 9. The graph shown in FIG. 19 shows results that were obtained by computer simulation. In the computer simulation, a starting material that is a 270 MPa-class mild steel sheet with a sheet thickness of 0.4 mm was taken as the blank starting material. In FIG. 19, circles indicate the results for locations at which a calculation was performed, and a curve shows the trend line. The abscissa in FIG. 19 represents a through-hole height ratio. The through-hole height ratio is a value obtained by dividing the height H2 of the intermediate stretch-formed portion 39 at the time when the through-hole 18 is formed, by a stretch-forming limit height H3. The term "stretch-forming limit height H3" refers to a limit value of the height of an stretch-formed portion that can be formed without a crack when an stretch-formed portion that has a similar outer circumferential shape as the stretch-formed portion 9 (in the present embodiment, a hexagonal shape) is formed by stretch-forming that is performed one time, without forming a through-hole in the blank. The ordinate in FIG. 19 represents a forming limit height ratio. The forming limit height ratio is a value obtained by dividing the limit value of the height of the stretch-formed portion 9 that can be formed without the occurrence of a crack by the aforementioned stretch-forming limit height H3.

Referring to FIG. 19 and FIG. 14(B), in a case where the shape of the outer circumferential portion of the intermediate stretch-formed portion 39 and the shape of the outer circumferential portion 9a of the stretch-formed portion 9 are hexagonal (polygonal), when the through-hole height ratio is in an arbitrary range between 0.0 to 1.0, the forming limit height is more than 1.0. That is, it is found that by forming the through-hole 18 arbitrarily during a period until the height H2 of the intermediate stretch-formed portion 39 reaches the stretch-forming limit height H3, the forming limit height H1 becomes larger than the stretch-forming limit height H3. Thus, it is clear that by forming the through-hole 18 before starting to form the stretch-formed portion 9 or during forming of the stretch-formed portion 9, the forming limit height H1 can be made larger than the stretch-forming limit height H3. In particular, before forming of the stretch-formed portion 9 starts (that is, when the through-hole height ratio is zero), or when the through-hole height ratio is less than 0.5, as is clear from the graph in FIG. 19, the forming limit height is particularly large. This is due to the fact that, when forming the stretch-formed portion 9, the earlier the timing (punching timing) at which the through-hole 18 is formed is, the more the amount of strain at the edge portion 18a of the through-hole 18 increases, and the amount of strain at the portion 9d that is directly below the stretch-formed-side top portion 9c can be lessened by a corresponding amount. Note that, if the through-hole height ratio is more than 0.5, the ratio of the amount of decrease in the forming limit height H1 with respect to the amount of increase in the through-hole height ratio is lowered. Thus, a critical significance exists in the numerical value of the through-hole height ratio being 0.5.

Note that, in the above embodiment, a form in which the outer circumferential portion 9a of each stretch-formed portion 9 is polygonal and the edge portion 18a of the through-hole 18 is polygonal is described as an example. However, a different form may also be adopted. A modification of the shape of the stretch-formed portion 9 is described hereunder. Note that, hereunder, configurations that are different from the above embodiment are mainly described, and components that are the like as in the above embodiment are denoted by the like reference symbols and a detailed description thereof is omitted.

<Modification of Shape of Edge Portion of Through-Hole>

FIG. 20 illustrates a modification of the shape of the edge portion 18a of the through-hole 18 of the stretch-formed portion 9, in which FIG. 20(A) is a plan view illustrating one stretch-formed portion 9, and FIG. 20(B) is a graph illustrating the relation between a ratio a/b between a radius of curvature a of the respective corner portions 18b of the edge portion 18a of the through-hole 18 and a distance b from a center P of the through-hole 18a to a midpoint of one side of the edge portion 18a of the through-hole 18, and the forming limit height.

Referring to FIG. 20(A), in the present modification, in each of the stretch-formed portions 9, the position of the corner portion 9b of the outer circumferential portion 9a of the stretch-formed portion 9 in the circumferential direction C of the through-hole 18 and the position of the corner portion 18b of the edge portion 18a of the through-hole 18 are caused to deviate with respect to each other. In the present modification, in the circumferential direction C, the angular pitch between two corner portions 9b and 9b that are adjacent to each other of the outer circumferential portion 9a of the stretch-formed portion 9 is 60 degrees. Further, the relevant corner portion 18b of the edge portion 18a of the through-hole 18 is arranged at a position corresponding to one half of the angular pitch between the corner portions 9b and 9b in question. In other words, the corner portions 9b of the outer circumferential portion 9a of the stretch-formed portion 9, and the corner portions 18b of the through-hole 18 are arranged at positions which are set so as deviate from each other by the amount of one half of the pitch in the circumferential direction C. In other words, the center position of the partial unit 10 in the longitudinal direction L and the corner portions 18b of the through-hole 18 are aligned in the radial direction of the through-hole 18. Note that, each corner portion 18b of the through-hole 18 may be arranged at a position other than a position corresponding to one half of the angular pitch between the corner portions 9b and 9b of the stretch-formed portion 9.

Further, in the present modification, each corner portion 18b of the regular polygon of the edge portion 18a of the through-hole 18 is formed in an arc shape. When the radius of curvature of this arc shape is defined as "a", and a distance from the center P of the through-hole 18 to the midpoint of any one side of the edge portion 18a is defined as "b", preferably $0.3 \leq a/b \leq 1.0$.

According to this modification, the outer circumferential portion 9a of the stretch-formed portion 9 is formed in an M-sided shape, the edge portion 18a of the through-hole 18 is formed in an N-sided shape and, in addition, M=N and, in the circumferential direction C of the through-hole 18, the positions of the corner portions 9b of the outer circumferential portion 9 and the positions of the corner portions 18b of the edge portion 18a are caused to deviate with respect to each other. According to this configuration, when forming the inner panel 2 from the blank sheet 30, the amount of strain around the corner portions 9b in the outer circumferential portion 9a of the stretch-formed portion 9 becomes largest, and furthermore, the amount of strain at the corner portions 18b in the edge portion 18a of the through-hole 18 becomes largest. Therefore, by causing the positions of the places where these amounts of strain become large to deviate in the circumferential direction C, strain can be prevented from concentrating at a specific place in the starting material. As a result, it can be made more difficult for a crack to occur during forming of the inner panel 2.

In particular, in the present modification, in the circumferential direction C, each corner portion 18b of the edge portion 18a of the through-hole 18 is arranged at a position corresponding to one half of the angular pitch between two of the corner portions 9b and 9b that are adjacent to each other of the outer circumferential portion 9a of the stretch-formed portion 9. With this configuration, the maximum value of the amount of strain generated in the starting material during forming of the stretch-formed portion 9 can be made as small as possible.

Furthermore, according to the present modification, each corner portion 18b of the regular polygon of the edge portion 18a of the through-hole 18 is formed in an arc shape. When the radius of curvature of this arc shape is defined as "a", and a distance from the center P of the through-hole 18 to the midpoint of any one side of the edge portion 18a is defined as "b", preferably $0.3 \leq a/b \leq 1.0$. By adopting a configuration in which $0.3 \leq a/b \leq 1.0$, the forming limit height H1 can be made larger. The reason it is preferable for the value of a/b to be such that $0.3 \leq a/b \leq 1.0$ in this way will now be described more specifically.

The graph shown in FIG. 20(B) shows results that were obtained by computer simulation. In the computer simulation, a starting material that is a 270 MPa-class mild steel sheet with a sheet thickness of 0.4 mm was taken as the blank starting material. The abscissa in FIG. 20(B) represents a/b. The ordinate in FIG. 20(B) represents a forming limit height ratio. The forming limit height ratio is a value obtained by dividing the limit value of the height to which the stretch-formed portion can be formed without a crack by the limit value when a/b=1.0, that is, when a=b.

Referring to FIG. 20(A) and FIG. 20(B), when a/b is 0.0, the corner portions of the edge portion of the through-hole have a pointed shape. Further, when a/b is less than 0.3, the degree of acuteness of the corner portions is large. Therefore, when forming the stretch-formed portion from a blank, the stress concentration at the corner portions of the edge portion of the through-hole increases, and as a result, the forming limit height becomes a small value. On the other hand, when $0.3 \leq a/b \leq 1.0$ or more, the corner portions 18b of the edge portion 18a of the through-hole 18 have a smooth shape. Therefore, when forming the stretch-formed portion 9 from the blank sheet 30, the stress concentration at the corner portions 18b of the edge portion 18a of the through-hole 18 is lessened, and consequently the forming limit height can be increased. Note that, when a/b>1.0, it can be said that the corner portions 18b of the edge portion 18a of the through-hole 18 cannot be made a smooth and simple curved shape, and consequently the forming limit height ratio is less than 1.0. This effect is more marked when $a/b \leq 0.8$. Note that, a similar effect will be obtained if the relation $0.3 \leq a/b$ is established in the aforementioned embodiment also.

<Modification of Shape of Stretch-Formed Portion>

Instead of the stretch-formed portion 9 having the polygonal outer circumferential portion 4, as illustrated in FIG. 21(A) and FIG. 21(B), a stretch-formed structure 6A that includes a plurality of stretch-formed portion 9A formed in a round shape by one partial unit 10A may be provided. FIG. 21 is a view illustrating a modification of the stretch-formed portion, in which FIG. 21(A) is a schematic plan view of the principal part, and FIG. 21(B) is a cross-sectional view along a line XXIB-XXIB in FIG. 21(A). The stretch-formed structure 6A has a configuration in which the stretch-formed portions 9A are disposed in a close-packed arrangement.

In the present modification with respect to the stretch-formed portion, a plurality of the stretch-formed portions 9A are disposed in a close-packed arrangement, with a hexagonal stretch-formed portion boundary 14A as a boundary of each stretch-formed portion 9A. The arrangement of the stretch-formed portions 9A is the same as the arrangement of the stretch-formed portions 9. Further, in each stretch-formed portion 9A, an inclined wall 12A is formed in a cylindrical shape, and a flange 11A is formed in a round shape. Note that, the inclined wall 12A and the flange 11A may be formed in an oval shape in plan view. Note that, in the stretch-formed structure 6A, the stretch-formed portions 9A need not be disposed in a close-packed arrangement, and another portion may be formed between the stretch-formed portions 9A and 9A that are adjacent.

Each stretch-formed portion 9A has one partial unit 10A. The partial unit 10A has the flange 11A, the inclined wall 12A continuous with the flange 11A, and a bottom portion 13A that is continuous with the inclined wall 12A and is separated from the flange 11A.

In two stretch-formed portions 9A and 9A that are adjacent, a frame portion 15A having a hat-shaped cross section is formed by a pair of the partial units 10A and 10A that include a pair of the bottom portions 13A and 13A which are butted against each other and are directly continuous with each other. A region in which the frame portion 15A is formed and the circumference of the frame portion 15A are shown by an elliptic dashed line in FIG. 21(A).

In the present modification, a distance D2A between the flanges 11A and 11A of two of the frame portions 15A and 1SA which are arranged separated from each other and are adjacent is defined. The distance D2A is the distance between the flanges 11A and 11A in a direction in which a line segment among center points P, P and P of the stretch-formed portions 9A, 9A and 9A to which two frame portions 15A and 15A belong is oriented, the two of the frame portions 15A and 15A being arranged separated from each other and are adjacent, in plan view. In the present modification, the maximum value of the distance D2A is preferably 250 mm or less, and the minimum value of the distance D2A is preferably 30 mm or more.

According to this modification, the stretch-formed portion 9A having a circular shape is formed by the partial unit 10A. According to this configuration, the formability when forming the stretch-formed portion 9A from a blank serving as the starting material of an inner panel 2A can be increased. In particular, the workability when increasing the height (depth) of the stretch-formed portion 9A can be enhanced.

The shape of an outer circumferential portion 9aA (a stretch-formed-side top portion 9cA) of the stretch-formed portion 9A is circular. That is, the outer circumferential portion 9aA of the stretch-formed portion 9A is formed in a circular shape. Further, a through-hole 18A is a circular shape. In this case, the "circular shape" is not limited to a perfect circular shape, and it suffices that the shape is a substantially circular shape, and furthermore may be an elliptical shape. Although in the present modification the circular shape of the stretch-formed-side top portion 9cA and the circular shape of the through-hole 18A are arranged concentrically, they need not be concentric.

By an edge portion 18aA of the through-hole 18A of the stretch-formed portion 9A being a circular shape in this way, when the stretch-formed portion 9A is being formed from the blank sheet 30, the degree of stress concentration at the edge portion 18aA can be made as small as possible.

The process for forming the inner panel 2A of the present modification from the blank sheet 30 is approximately the same as the process for forming the inner panel 2 from the blank sheet 30 that is described above, and the processes differ from each other with respect to the following point. That is, in each of the press forming machines 42 to 46, the shapes of the punch and the die are formed in a circular shape in plan view to be in accordance with the shape of the stretch-formed portion 9A. Further, apart from differences between the reference numerals, the explanatory diagrams (FIG. 8 to FIG. 15) for forming the inner panel 2 from the blank sheet 30 are the same as explanatory diagrams for forming the inner panel 2A from the blank sheet 30. Therefore, illustration of the description for forming the inner panel 2A from the blank sheet 30 will be omitted.

In the above embodiment it is described that in a case where the intermediate stretch-formed portion 39 is formed, in the process for forming the inner panel 2 from the blank sheet 30, the intermediate forming height H2 is preferably less than one half of the height H1 of the stretch-formed portion 9. On the other hand, in the present modification, in a case where an intermediate stretch-formed portion 39A is formed, in the process for forming the inner panel 2A from the blank sheet 30, an intermediate forming height H2A is preferably greater than one half of a height H1A of the stretch-formed portion 9A and less than the height H1A. According to this configuration, the allowance of the height H1A of the stretch-formed portion 9A can be made higher. Further, even in a case where the height H1A of the stretch-formed portion 9A is comparatively low, the occurrence of a crack in the intermediate stretch-formed portion 39A or the stretch-formed portion 9A can be more surely suppressed. The reason the intermediate forming height M2A is preferably made less than one half of the height H1A of the stretch-formed portion 9A will now be described more specifically.

Figure 22:
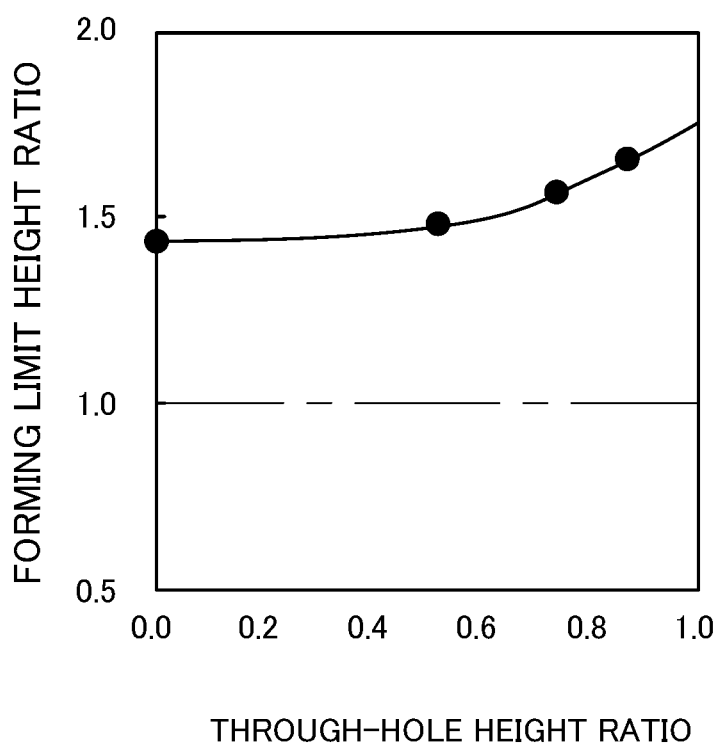
FIG. 22 is a diagram illustrating the relation between a height of an intermediate stretch-formed portion when a through-hole is formed by piercing, and a limit value (allowance) of a height that can be formed as an stretch-formed portion with respect to the modification of a shape of the stretch-formed portion.

FIG. 22 is a diagram illustrating the relation between the height H2A of the intermediate stretch-formed portion 39A at a time when the through-hole 18A is formed by piercing, and a limit value (allowance) of the height H1A that can be formed as the stretch-formed portion 9A, in the modification of the shape of the stretch-formed portion (the stretch-formed portion 9A). The graph shown in FIG. 22 shows results that were obtained by computer simulation. In the computer simulation, a starting material that is a 270 MPa-class mild steel sheet with a sheet thickness of 0.4 mm was taken as the blank starting material. In FIG. 22, circles indicate the results obtained for locations at which a calculation was performed, and a curve shows the trend line. The abscissa in FIG. 22 represents a through-hole height ratio. The through-hole height ratio is a value obtained by dividing the height H2A of the intermediate stretch-formed portion 39A at the time when the through-hole 18A is formed, by a stretch-forming limit height H3A. The term "stretch-forming limit height 13A" refers to a limit value of the height of a stretch-formed portion that can be formed without a crack when a stretch-formed portion that has a similar outer circumferential shape as the stretch-formed portion 9A (in the present embodiment, a round shape) is formed by draw forming that is performed one time, without forming a through-hole in the blank. The ordinate in FIG. 22 represents a forming limit height ratio. The forming limit height ratio is a value obtained by dividing the limit value of the height of the stretch-formed portion 9A that can be formed without the occurrence of a crack by the aforementioned stretch-forming limit height H3A.

Referring to FIG. 14(B) in which the intermediate stretch-formed portion 39 that is equivalent to the intermediate stretch-formed portion 39A is illustrated and FIG. 22, in a case where the shape of the outer circumferential portion of the intermediate stretch-formed portion 39A and the shape of the outer circumferential portion 9a of the stretch-formed portion 9 are round, when the through-hole height ratio is in an arbitrary range between 0.0 to less than 1.0, the forming limit height is more than 1.0. That is, it is found that by forming the through-hole 18A to an arbitrary height during the period until the height of the intermediate stretch-formed portion 39A reaches the stretch-forming limit height H3A, the forming limit height H1A becomes larger than the stretch-forming limit height H3A. Thus, it is clear that by forming the through-hole 18A before starting to form the stretch-formed portion 9A or during forming of the stretch-formed portion 9A, the forming limit height H1A can be made larger than the stretch-forming limit height H3A. In particular, when the through-hole height ratio is 0.5 or more, as is clear from the graph in FIG. 22, the forming limit height is particularly large. This is because, even when the through-hole height ratio is raised, in the stretch-forming before piercing, deformation of a portion that corresponds to the final rupture position after piercing (portion corresponding to the stretch-formed-side top portion 9c) does not progress much, and deformation of a shoulder portion in the vicinity of the stretch-formed-side top portion of the intermediate stretch-formed portion 39 progresses. With respect to the deformation after piercing, deformation of the shoulder portion in the vicinity of the stretch-formed-side top portion of the intermediate stretch-formed portion 39 progresses only slightly, and deformation of the edge portion 18a of the through-hole 18 and a flange part in the vicinity of the edge portion 18a progresses. This, therefore, is the reason why the higher the through-hole height ratio is, the greater the degree to which the total deformation of the edge portion 18a of the through-hole 18 and the flange part in the vicinity of the edge portion 18a progresses can be suppressed. Note that, if the through-hole height ratio is more than 0.5, the ratio of the amount of increase in the forming limit height H1A with respect to the amount of increase in the through-hole height ratio increases. Thus, a critical significance exists in the numerical value of the through-hole height ratio being 0.5. The through-hole height ratio is more preferably 0.50 to 0.95.

<Other Modifications> in the above embodiment and modifications, it is described that the sheet thickness t3 of the outer panel 3 is preferably 0.6 mm or less. However, the sheet thickness t3 need not be 0.6 mm or less. It suffices that at least the inner panel 2 can be made lightweight and high rigidity, and the sheet thickness t3 of the outer panel 3 may be greater than 0.6 mm.

In the above embodiment and modifications, forms in which the inner panel 2 and the outer panel 3 are formed of steel sheets are described as examples. However, the inner panel 2 and the outer panel 3 need not be formed of steel sheets. The inner panel 2 and the outer panel 3 may be formed of a metal material such as an aluminum alloy or a magnesium alloy, or a resin material such as glass fiber or carbon fiber. Further, the inner panel 2 and the outer panel 3 may be formed of a composite material of a metal material and a resin material or the like.

Further, the piercing for forming the through-hole 18 (process of (ii)) may be performed collectively with the process of (i) or the process of (iii) by one press forming machine. Furthermore, the process of (iv) may be performed collectively with the process of (ii) or (iii).

INDUSTRIAL APPLICABILITY

The present invention can be widely applied as an automobile inner panel and an automobile panel.

REFERENCE SIGNS LIST 2, 2A Inner Panel (Press-formed Product)
4 Outer Circumferential Portion
5 Outline portion
9, 9A Stretch-formed portion
9a Outer Circumferential Portion of Stretch-formed portion
9b Corner Portion of Outer Circumferential Portion
18, 18A Through-hole
18a Edge Portion of Through-hole
18b Corner Portion of Edge Portion
30 Blank Sheet
31 Manufacturing Intermediate
38 Planned outline portion
39, 39A Intermediate stretch-formed portion
40 Flat Portion (Flat-shaped Portion)
41 to 46 Press forming machine
50 Vacuum Carrier Machine
C Circumferential Direction of Through-hole
H1, H1A Height of Stretch-formed portion
H2, H2A Intermediate Forming Height

The invention claimed is:

1. A method for manufacturing a press-formed product, comprising:
   forming a manufacturing intermediate by forming a planned outline portion including an undulating shape in a flat-sheet shaped blank sheet, as a planned portion for an outline portion which forms an outline of an outer circumferential portion of the press-formed product;
   maintaining a flat shape of the blank sheet in a region from the planned outline portion toward a center of the manufacturing intermediate, or forming an intermediate stretch-formed portion having a predetermined intermediate forming height in the manufacturing intermediate in a region from the planned outline portion toward a center of the manufacturing intermediate;
   piercing a flat portion and forming a through-hole while maintaining the flat shape of the flat portion or piercing a stretch-formed-side top portion of the intermediate stretch-formed portion and forming a through-hole; and
   after the through-hole is formed in the flat portion, forming the flat portion into a stretch-formed portion of a predetermined height, or, after the through-hole is formed in the intermediate stretch-formed portion, forming the intermediate stretch-formed portion into the stretch-formed portion of the predetermined height that is greater than the predetermined intermediate forming height.

2. The method for manufacturing the press-formed product according to claim 1, wherein:
   the blank sheet is a sheet member having a sheet thickness of 0.5 mm or less.

3. The method for manufacturing the press-formed product according to claim 1, wherein:
   the planned outline portion includes a planned flat outline portion; and
   after the planned outline portion is formed from the blank sheet, the manufacturing intermediate is carried from a press forming machine that forms the planned outline portion to a different press forming machine that is used in a downstream process after the planned outline portion is formed, by carrying the manufacturing intermediate while supporting the planned flat outline portion using a carrier machine.

4. The method for manufacturing the press-formed product according to claim 1, wherein:
   after the planned outline portion is formed from the blank sheet, the planned outline portion is made into the outline portion by subjecting the planned outline portion to finishing work that includes a restriking process.

5. The method for manufacturing the press-formed product according to claim 1, wherein:
   a shape of an outer circumferential portion of the stretch-formed portion is a polygon.

6. The method for manufacturing the press-formed product according to claim 5, wherein:
   the predetermined intermediate forming height is less than one half of the height of the stretch-formed portion.

7. The method for manufacturing the press-formed product according to claim 5, wherein:

the outer circumferential portion of the stretch-formed portion is formed in an M-sided shape (M is an integer of 3 or more);

an edge portion of the through-hole is formed in an N-sided shape (N is an integer of 3 or more); and M is equal to N, and a position of a corner portion of the outer circumferential portion and a position of a corner portion of the edge portion are caused to deviate in a circumferential direction of the through-hole.

8. The method for manufacturing the press-formed product according to claim 7, wherein:

the corner portion of the edge portion is arranged at a position corresponding to one half of an angular pitch between two corner portions which are adjacent to each other of the outer circumferential portion in the circumferential direction.

9. The method for manufacturing the press-formed product according to claim 5, wherein:

a shape of an edge portion of the through-hole is a regular polygon;

each corner portion of the regular polygon of the edge portion is formed in an arc shape; and when a radius of curvature of the arc shape is defined as "a", and a distance from a center of the through-hole to a midpoint of any one side of the edge portion is defined as "b", $0.3 \leq a/b \leq 1.0$.

10. The method for manufacturing the press-formed product according to claim 1, wherein:

a shape of an outer circumferential portion of the stretch-formed portion is a circular.

11. The method for manufacturing the press-formed product according to claim 10, wherein:

the predetermined intermediate forming height is greater than one half of the predetermined height of the stretch-formed portion and is less than the predetermined height of the stretch-formed portion.

12. The method for manufacturing the press-formed product according to claim 10, wherein:

an edge portion of the through-hole is circular.

* * * * *